(12) United States Patent
Singh

(10) Patent No.: US 12,114,169 B2
(45) Date of Patent: Oct. 8, 2024

(54) DEDICATED WIDE AREA NETWORK SLICES

(71) Applicant: Microsoft Technology Licensing, LLC, Redmond, WA (US)

(72) Inventor: Rachee Singh, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 64 days.

(21) Appl. No.: 17/387,798

(22) Filed: Jul. 28, 2021

(65) Prior Publication Data
US 2023/0032806 A1    Feb. 2, 2023

(51) Int. Cl.
*H04B 10/11* (2013.01)
*H04W 16/02* (2009.01)
*H04W 16/14* (2009.01)

(52) U.S. Cl.
CPC .......... *H04W 16/02* (2013.01); *H04B 10/11* (2013.01); *H04W 16/14* (2013.01)

(58) Field of Classification Search
CPC ....... H04W 16/02; H04W 16/14; H04B 10/11
See application file for complete search history.

(56) References Cited

U.S. PATENT DOCUMENTS

| | | | | |
|---|---|---|---|---|
| 6,735,631 | B1 * | 5/2004 | Oehrke | H04L 67/101 709/239 |
| 9,270,376 | B2 * | 2/2016 | Rival | H04B 10/27 |
| 10,841,183 | B1 * | 11/2020 | Shahriar | H04J 14/0257 |
| 11,115,318 | B2 * | 9/2021 | Fujisawa | H04L 45/123 |
| 11,818,420 | B2 * | 11/2023 | Wang | H04N 21/43637 |
| 2011/0307889 | A1 * | 12/2011 | Moriki | G06F 11/3419 718/1 |
| 2013/0230316 | A1 * | 9/2013 | Hussain | H04J 14/0272 398/34 |
| 2016/0234099 | A1 * | 8/2016 | Jiao | H04L 47/2441 |

(Continued)

FOREIGN PATENT DOCUMENTS

| | | |
|---|---|---|
| EP | 3304819 A1 | 4/2018 |
| WO | 2016192633 A2 | 12/2016 |

OTHER PUBLICATIONS

Anna, Tzanakaki, "5G Programmable Infrastructure Converging disaggregated network and compute Resources. D2.2 System architecture and preliminary evaluations", Retrieved From: https://www.5g-picture-project.eu/download/5g-picture_D2.2.pdf, Jul. 31, 2018, 94 Pages.

(Continued)

*Primary Examiner* — Tanya T Motsinger
(74) *Attorney, Agent, or Firm* — Mark K. Young; Mark Young PC

(57) ABSTRACT

Infrastructure comprising a wide area network (WAN) is adapted as a transport network portion of a 5G network in which the WAN is sliced at the optical layer on a discrete wavelength basis to provide dedicated network capacity to customers such as service providers, application providers, and network operators. Optical layer slicing extends the slicing construct for a radio access network (RAN) portion of the 5G network through to the WAN to provide end-to-end 5G network slicing from user equipment (UE) accessing an air interface of the network to application servers that are instantiated in data centers in a network cloud portion of the 5G network.

20 Claims, 25 Drawing Sheets

(56) References Cited

U.S. PATENT DOCUMENTS

| | | | | |
|---|---|---|---|---|
| 2017/0093487 | A1* | 3/2017 | Grammel | H04B 10/0777 |
| 2018/0041905 | A1* | 2/2018 | Ashrafi | H04W 16/10 |
| 2018/0376338 | A1* | 12/2018 | Ashrafi | H04L 41/0816 |
| 2020/0106755 | A1* | 4/2020 | Gulbay | H04L 63/107 |
| 2020/0177629 | A1* | 6/2020 | Hooda | H04L 47/125 |
| 2021/0075776 | A1* | 3/2021 | Chen | H04L 63/0442 |
| 2022/0416495 | A1* | 12/2022 | Neog | H04B 10/27 |

OTHER PUBLICATIONS

Gangopadhyay, et al., "SDN-enabled Slicing in Disaggregated Multi-domain and Multi-layer 5G Transport Networks", In Proceedings of 23rd International Symposium on Wireless Personal Multimedia Communications, Oct. 19, 2020, 6 Pages.

"International Search Report and Written Opinion Issued in PCT Patent Application No. PCT/US22/035400", Mailed Date: Oct. 28, 2022, 15 Pages.

* cited by examiner

800

DEDICATED WIDE AREA NETWORK SLICES

BACKGROUND

Fifth generation (5G) mobile networks offer the ability to connect tens of billions of intelligent devices, densely deployed and generating orders of magnitude more data to be handled by the network. Consumers' expectations for 5G mobile networks are high and mobile network operators will be under real pressure from enterprise customers to move quickly, delivering 5G's low latency, dense device, and high-performance capabilities to enable near-real-time management and control of critical business operations.

SUMMARY

Infrastructure comprising a wide area network (WAN) is adapted as a transport network portion of a 5G network in which the WAN is sliced at the optical layer on a discrete wavelength basis to provide dedicated network capacity to customers such as service providers, application providers, and network operators. Optical layer slicing extends the slicing construct for a radio access network (RAN) portion of the 5G network through to the WAN to provide end-to-end 5G network slicing from user equipment (UE) accessing an air interface of the network to application servers that are instantiated in data centers in a network cloud portion of the 5G network.

In various illustrative embodiments, a WAN slice controller may be instantiated as an SDN (software-defined network) component of the 5G network. The WAN slice controller is operable to provide a customer with one or more dedicated wavelengths along a WAN slice path from an entry node in the WAN to a destination node. The intermediate WAN nodes between the entry and destination nodes on the slice path are selected by the controller and configured to enable traffic carried on the WAN slice to remain in the optical domain where possible. Such WAN node configurations keep the dedicated traffic isolated from other WAN traffic and enable bypassing of optical-electrical-optical (OEO) conversions in network equipment operating in layers (e.g., L2, L3) above the physical layer. By optically bypassing an intermediate node, utilization of optical line terminal (OLT) and router ports may be reduced or eliminated. Congestion events for the dedicated traffic are thus minimized and the overall network efficiency is enhanced by reducing the loading on scarce port resources and by avoiding a need to re-provision the dedicated traffic at each intermediate node of the WAN slice.

The WAN slice controller may further be configured to dynamically allocate WAN resources and provision nodes for data traffic traversing the WAN to carve out contiguous optical spectrum for the dedicated WAN slices on demand. The WAN slice controller continuously monitors the states of the overall WAN and its constituent nodes, in view of changing network conditions, operations, and traffic loading, to select and configure suitable nodes along the slice path as needed to instantiate a dedicated WAN slice with minimal disruption to other traffic. The WAN slice controller assigns spectrum and provisions traffic on the WAN holistically to ensure that all applicable service level agreements (SLAs) and other guarantees are satisfied for all the WAN traffic, dedicated and non-dedicated, over a given time period, with statistical confidence.

Advantageously, the present WAN slicing leverages wavelengths in the optical domain to provide customers with dedicated capacity that is free from conflict with co-existing traffic on the 5G network. Strong quality of service (QoS) guarantees with regard to, for example, throughput, latency, reliability, etc., may be provided to customers to support a variety of differentiated service offerings. For example, WAN slice customers can provide end users with services and applications that generate bursty, unpredictable traffic patterns having stringent demands on bandwidth and transmission performance with the confidence that the QoS guarantees will be satisfied even if the rest of the 5G network is undergoing high utilization. In addition, WAN slicing at the optical layer provides a high degree of isolation of the traffic on the dedicated WAN slice from other WAN traffic. Such isolation can enhance data security on a dedicated WAN slice and may also facilitate network monitoring and troubleshooting of issues with the customer's traffic.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. It will be appreciated that the above-described subject matter may be implemented as a computer-controlled apparatus, a computer process, a computing system, or as an article of manufacture such as one or more computer-readable storage media. These and various other features will be apparent from a reading of the following Detailed Description and a review of the associated drawings.

DESCRIPTION OF THE DRAWINGS

Like reference numerals indicate like elements in the drawings. Elements are not drawn to scale unless otherwise indicated.

Figure 1:
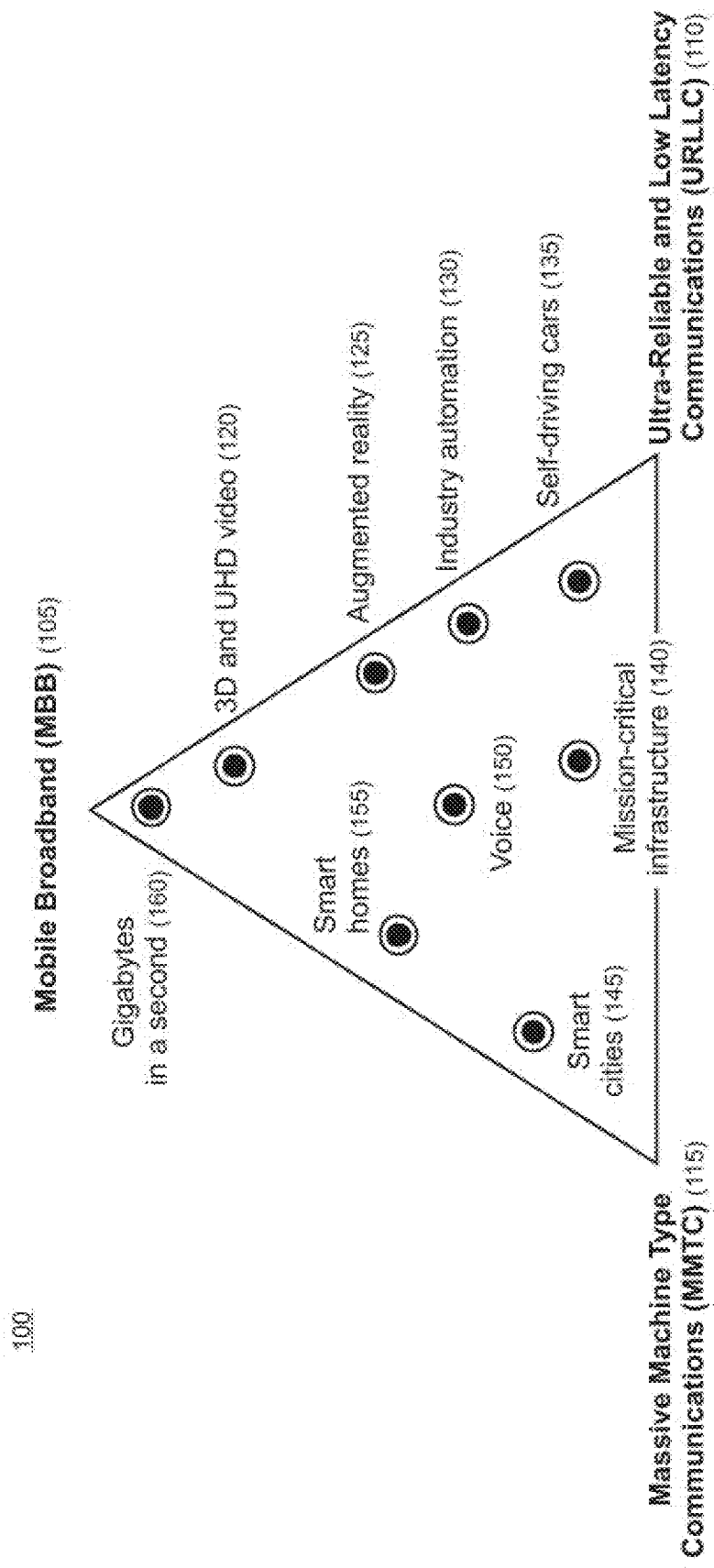
FIG. 1 shows illustrative 5G network usage scenario examples.

DETAILED DESCRIPTION 5G mobile networks utilize a service-based architecture that supports data connectivity and services enabling deployments using techniques such as, for example, network function virtualization (NFV), software-defined networking (SDN), and cloud computing. Some exemplary features and concepts of 5G networking include separating User Plane (UP) functions from Control Plane (CP) functions to enable independent scalability, evolution, and flexible deployment across, for example, centralized locations and/or distributed (i.e., remote) locations. The functional design of 5G networks is modularized to enable flexible and efficient network slicing. Dependencies are also minimized between the Radio Access Network (RAN) and the Core Network (CN). The 5G architecture is thus defined with a converged core network with a common AN-CN interface which integrates different Access Types, for example 3GPP (3rd Generation Partnership Project) access and untrusted non-3GPP access such as WiMAX, cdma2000®, WLAN, or fixed networks.

The International Mobile Telecommunications (IMT) recommendation for 2020 from the International Telecommunication Union Radiocommunication Sector (ITU-R M.2083-0) envisions usage scenarios for 5G networks that include: Mobile Broadband (MBB), as indicated by reference numeral 105; Ultra-Reliable and Low Latency Communications (URLLC) 110; and Massive Machine Type Communications (MMTC) 115, as shown in the usage scenario footprint 100 in FIG. 1.

The MBB usage scenario 105 addresses the human-centric use cases for access to multi-media content, services, and data. The demand for mobile broadband will continue to increase, leading to enhanced Mobile Broadband. The enhanced MBB usage scenario will come with new application areas and requirements in addition to existing MBB applications for improved performance and an increasingly seamless user experience. The enhanced MBB usage scenario may cover a range of cases, including wide-area coverage and hotspot, which have different requirements.

For the hotspot case (i.e., for an area with high user density), very high traffic capacity is needed, while the requirement for mobility is typically low and user data rate is higher than that of wide-area coverage. For the wide-area coverage case, seamless coverage and medium to high mobility are desired, with much improved user data rate—20 Gbps for download and 10 Gbps for upload—compared to existing data rates. However, the data rate requirement may be relaxed compared to hotspot.

The URLLC usage scenario 110 may typically have relatively stringent requirements for capabilities such as latency and availability. For example, latency in the RAN may be expected to be less than 1 ms with high reliability. Some examples include wireless control of industrial manufacturing or production processes, remote medical surgery, distribution automation in a smart grid, transportation safety, etc.

The MMTC usage scenario may be characterized by a very large number of connected devices such as Internet of Things (IoT) devices with hundreds of thousands of connected devices per square kilometer. MMTC may also be referred to as "Massive IoT" (MIoT) in some 5G literature. Such connected devices can be expected to transmit a relatively low volume of non-delay-sensitive data. Devices are typically required to be low cost and have a very long battery life.

Illustrative applications for 5G networking are also shown in FIG. 1. The applications can fall within the usage scenario examples 100 at different locations depending on a given balance of application networking requirements. As shown, the illustrative applications can include three-dimensional and/or ultra-high-definition (3D and UHD) 120; augmented reality 125; industry automation 130; self-driving cars 135; mission-critical infrastructure 140; smart cities 145; voice 150; smart homes 155; and gigabytes in a second 160.

It is emphasized that the ITU expects additional 5G usage scenarios and applications to emerge, and 5G network operators may not necessarily be limited to or required to support any particular usage scenarios or pre-defined slice types. Similarly, application and service providers may be expected to leverage the higher speeds and lower latency of 5G to develop feature-rich capabilities for all kinds of connected devices (both fixed and mobile), deliver compelling user experiences across a range of computing devices and platforms, and further realize the potential of artificial intelligence (AI) and IoT in a way that current connectivity prohibits.

With 5G, mobile networks can be optimized as features such as network slicing become available for both operators and enterprises deploying 5G infrastructure. A network slice is a logical (i.e., virtual) network customized to serve a defined purpose, type/class of service, quality of services (QoS), or dedicated customers. A 5G network slice may be dynamically created consisting of an end-to-end composition of all the varied network resources and infrastructure needed to satisfy the specific performance and requirements of a particular service class or application that may meet some pre-defined service level agreement (SLA). Each portion of the 5G network is respectively sliced such that the network can be viewed as being composed of air interface slices, RAN slices, mobile core slices, cloud slices, etc. 5G network slicing thus enables creation of multiple logical and secure networks that are isolated from each other, but which span over the same common physical network infrastructure.

5G network slices may consist of resources composed into an end-to-end service delivery construct. These may include physical resources, either a share or profile allocated to a slice, or dedicated physical resources in some cases. Slices also consist of logical entities such as configured network functions, management functions, VPNs (virtual private networks), etc. Resources (physical or logical) can be dedicated to a 5G network slice, i.e., separate instances, or they may be shared across multiple slices. These resources are not necessarily all produced within the mobile network provider as some may comprise services consumed from other providers, facilitating, for example, aggregation, cloud infrastructure, roaming, etc.

Figure 2:
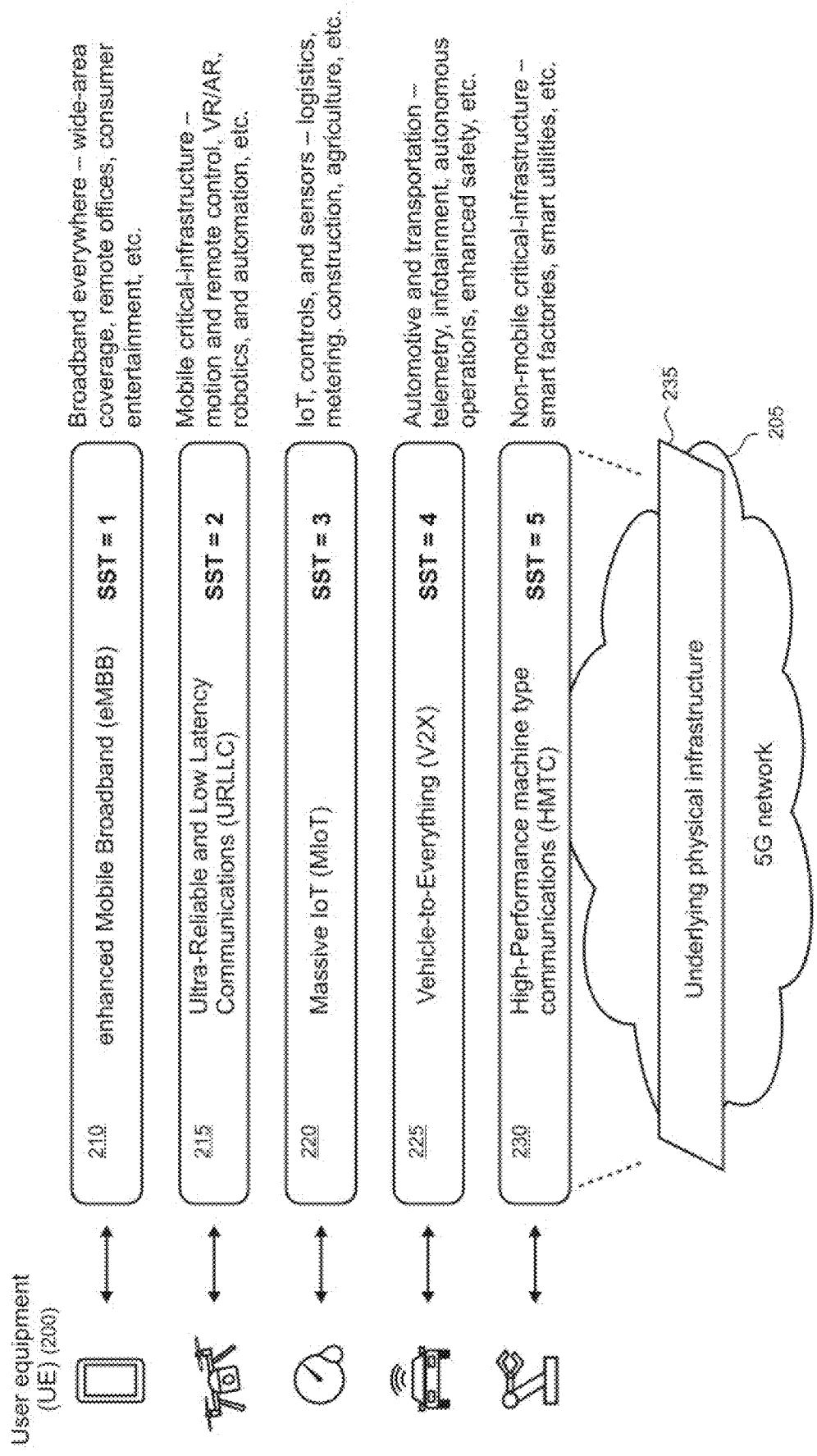
FIG. 2 shows illustrative standardized 5G network slices.

3GPP is the principal standards organization engaged in the architecture development for 5G. Several iterations of standards releases have established a foundation for the current phase of slice-specific definition. The 3GPP R15 System Architecture (3GPP TS 23.501) currently defines standard service-based Slice/Service types (SST). As shown in FIG. 2, the standardized 3GPP network slices of a 5G network 205 include eMBB (enhanced Mobile Broadband) (SST=1), URLLC (SST=2), and MIoT (SST=3) which correspond to the usage scenarios described by ITU-R 2083-0. Additional standardized SST values for V2X (Vehicle-to-Everything) (SST=4) and HMTC (High-Performance Machine Type Communications (SST=5) are also defined by 3GPP. It may be appreciated that slice service types beyond those having standardized SST values can also be defined.

The five standardized or pre-defined service types for 5G network slices are respectively indicated by reference numerals 210, 215, 220, 225, and 230 in FIG. 2. IMT-2020 describes the concept of network slicing as supporting a wide variety of requirements in UE and application services using a network where multiple logical network instances tailored to the requirements can be created. Network slicing allows the 5G network operator to provide dedicated logical networks (i.e., network slices) with customer specific functionality. The 5G architecture enables different network configurations in different network slices.

A network slice can be dedicated to different types of services and span all the domains of the underlying physical infrastructure 235, such as the transport network supporting flexible locations of functions, dedicated radio configurations or specific radio access technologies (RATs), and the mobile core network. Network slices can also be deployed across multiple operators. Slices can share common physical infrastructure or may have dedicated resources and/or functions in some cases. Different types of network slices can be composed of not only standardized network functions but also some proprietary functions that may be provided by different operators or third parties.

Standardized SST values and pre-defined slice types provide a way for establishing global interoperability for 5G network slicing so that operators can efficiently support key industry verticals—for example, industrial automation, healthcare, entertainment, transportation, manufacturing, energy, agriculture, construction, security, etc.—for the most commonly-used pre-defined Slice/Service Types. Additional customization and/or specialization for applications and services may be implemented for specific usage scenarios. A UE may provide Network Slice Selection Assistance Information (NSSAI) parameters to the network to help it select a RAN and a core network part of a slice instance for the device. A single NSSAI may lead to the selection of several slices. NSSAI consists of Session Management NSSAIs (SM-NSSAI), which each include an SST and possibly a Slice Differentiator (SD). SST may refer to an expected network behavior in terms of features, e.g., broadband or IoT, while the SD can help in the selection among several slice instances of the same type. It is noted that services supported in a standardized pre-defined slice may also be supported by other pre-defined slices having other (i.e., non-standard) SST values.

FIG. 2 shows user equipment (UE) 200 that may be representative of the wide variety of device types that may utilize 5G networking including, for example and not by way of limitation, smartphones and computing devices, drones, robots, process automation equipment, sensors, control devices, vehicles, transportation equipment, tactile interaction equipment, virtual and augmented reality (VR and AR) devices, industrial machines, and the like. The standardized slices can be respectively mapped to such UE types in typical usage scenarios to optimize network utilization and user experiences, but 5G network slicing is designed for flexibility to meet demand across a wide spectrum of device types and diverse applications and services. The network softwarization provided by SDN and NFV paradigms in 5G enables network slice configuration—i.e., how various physical infrastructure and network resources are deployed—to be rapidly and dynamically adapted to ensure that performance objectives are continuously met for 5G applications across a given population of UEs.

As shown, the configuration of eMBB slice 210 may be optimized for broadband-everywhere usage scenarios across a wide coverage area for applications such as consumer entertainment (e.g., video, gaming, streaming), remote offices, etc., where maximized network speeds and data rates are desired and high traffic volumes are typically experienced. The URLLC slice 215 may be configured for mobile critical-infrastructure low-latency usage scenarios including applications such as remote-control operations in medical and industrial environments, VR and AR, robotics and automation, etc.

The MIoT slice 220 may be configured for optimal handling of IoT, control, and sensor applications relating to logistics, construction, and metering in vertical industries such as construction and agriculture. The V2X slice 225 may be optimized for automotive and transportation applications such as telemetry, infotainment, autonomous operations, enhanced safety, and the like. The HMTC slice 230 is typically configured for optimal handling of non-mobile/fixed critical-infrastructure applications such as smart factories, smart utilities, etc.

Figure 3:
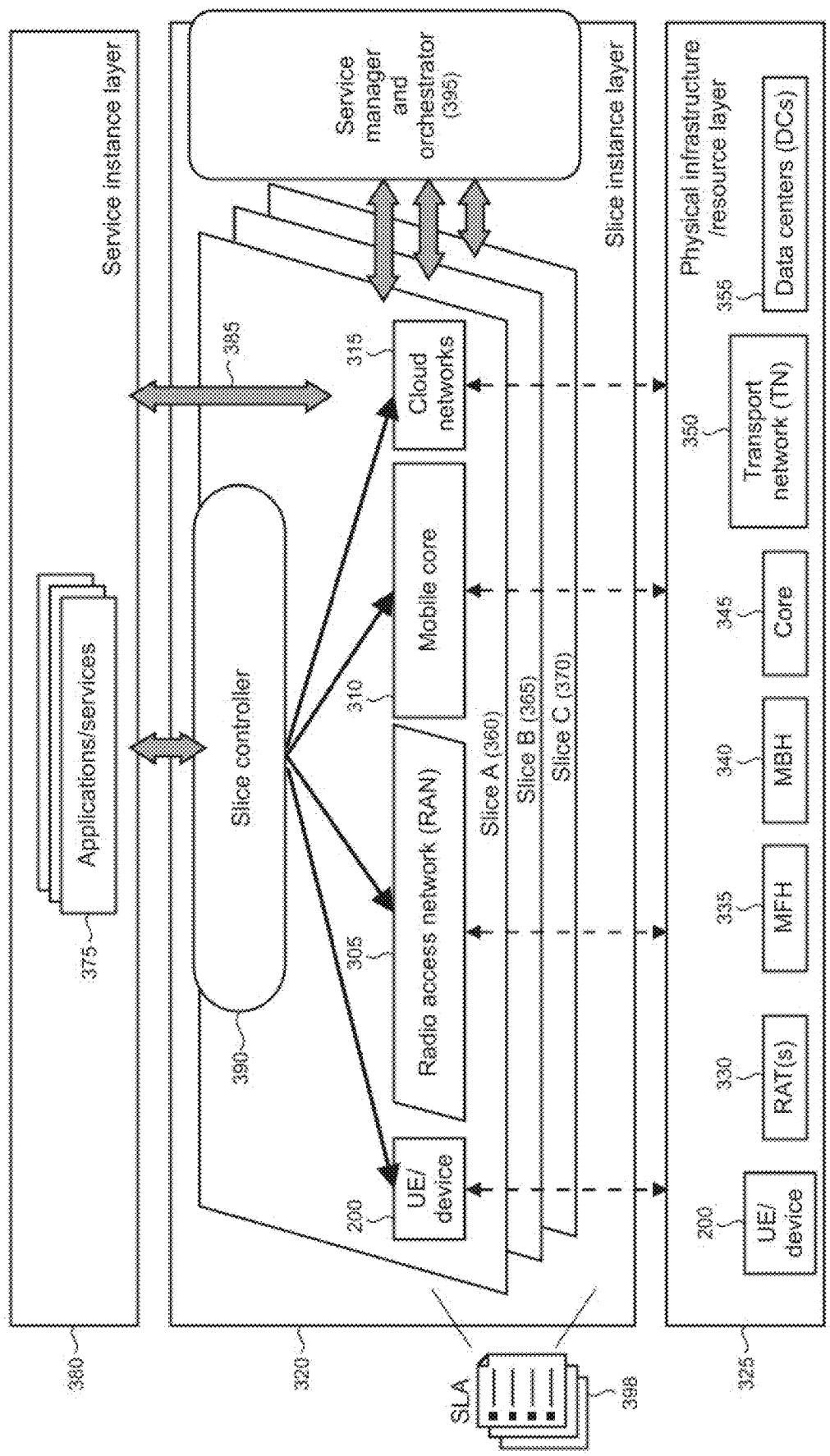
FIG. 3 shows an illustrative layered 5G network slicing framework.

FIG. 3 shows an illustrative layered 5G network slicing framework 300 that is described in the IMT-2020 recommendation. The framework comprises a RAN 305, mobile packet core 310, and cloud networking components 315 that are logically represented in a network slice instance layer 320 that sits above a physical infrastructure layer 325 in the framework. The physical infrastructure layer provides an abstraction of radio, compute, network, and storage resources which may include, for example, one or more RATs 330, mobile fronthaul (MFH) 335, mobile backhaul (MBH) 340, mobile core network 345, transport network (TN) 350, and one or more datacenters (DCs) 355. In some cases, one or more UE instances may be implemented as resources.

In this illustrative example, the slice instance layer includes three 5G network slices—Slice A 360, Slice B 365, and Slice C 370, but more or fewer slices may be utilized in any given implementation at any given time. These slices may include one or more of the pre-defined slice types shown in FIG. 2 and described in the accompanying text or may comprise different slice types.

Slices may be isolated by logically or physically isolating their underlying resources. The slices can support instances of various applications and/or services (collectively indicated by reference numeral 375) in a service instance layer 380, for example, using an application programming interface (API), as representatively indicated by reference numeral 385. Each network slice may be viewed as an independent logical collection of resources which can dynamically vary in configuration from slice to slice as needed to meet pre-defined technical characteristics (e.g., throughput, latency, reliability, etc.) and/or business characteristics as required by an application/service instance.

A slice controller 390 is utilized with the slicing framework 300 to maintain awareness of the application requirements to responsively allocate and manage the virtualized network functions and resources in each slice. A service manager and orchestrator 395 combines the necessary resources and functions to produce a network slice instance. Its main tasks include creation of slice instances upon the underlying physical infrastructure, dynamically mapping network functions to slice instances to meet changing context, and maintaining communication between the application and services and the framework to manage slice lifecycle.

As shown, a service level agreement (SLA) 398 is typically applicable to each of the slices 360, 365, and 370. The applicable SLAs can vary in scope and composition. The slice controller 390 may be advantageously utilized to perform resource allocation among RAN slices to meet the connectivity requirements while ensuring compliance with applicable SLA guarantees in some cases.

An SLA may be defined as a contract between the provider of a service and its internal or external end-user or customer that defines what services the provider will offer and the level of performance it must meet as well as any remedies or penalties should the agreed-upon levels not be realized. According to the ITU, an "SLA is a formal agreement between two or more entities that is reached after a negotiating activity with the scope to assess service characteristics, responsibilities and priorities of every part." SLAs typically establish customer expectations for a provider's performance and quality.

Various types of customers can be supported by the present dedicated WAN slices, typically depending on applicable circumstances and context. For example, customers may include, but are not limited to consumers (i.e., end users), businesses, enterprises, organizations, service providers, application developers, application providers, mobile network operators, internet service providers, and the like. A customer may support its own services to customers (e.g., end users) as well as services sourced from multiple different third-party providers. For example, one third-party provider may offer services to customers on one particular network slice while another third-party provider offers services on another network slice. Each discrete service offering may have its own corresponding distinct SLA.

SLA terms may include metrics covering technical aspects of service, for example describing a level and volume of communication services and which measure the performance characteristics of a provided service. Such technical metrics may include but not be limited to, for example, availability, throughput, latency, bit/packet error rate, and energy. SLAs may also include business, economic, and legal terms covering the agreement between the service provider and the customer. SLAs for different service and slice types can vary. For example, some slice types have more elasticity with regard to RAN resource allocation where resources can be readily adjusted depending on resource demand. Other slice types may be more inelastic. For example, the URLLC slice type may require strict resource allocation to guarantee reliability and low latency under a corresponding SLA, while enhanced MBB resources may be readily scaled downward once the edge cloud buffering is complete.

Figure 4:
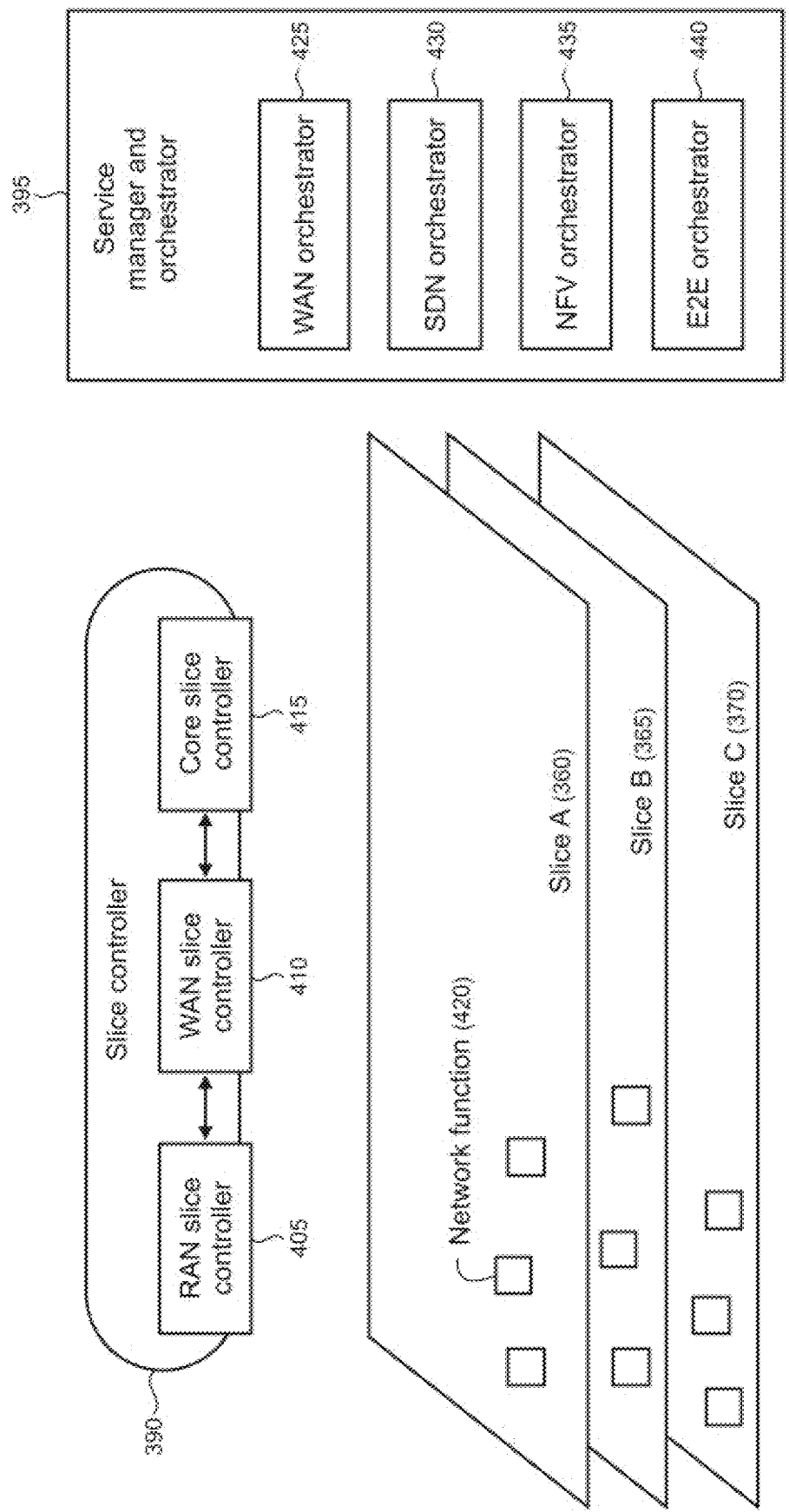
FIG. 4 shows illustrative details of a slice controller and service manager and orchestrator.

FIG. 4 shows illustrative details of the slice controller 390 and service manager and orchestrator 395. The slice controller may include constituent slicing components including a RAN slice controller 405, a WAN slice controller 410, and a core slice controller 415. Typically, the individual controllers are instantiated as SDN (software-defined networking) components. It may also be appreciated that the functionalities of the slice controllers may be combined in some cases or distributed among components in the slicing architecture differently than shown in the drawings.

Each slice controller may be particularly adapted in view of the different characteristics of the various technical domains including the RAN, core network, and transport network (e.g., WAN). Accordingly, each slice 360, 365, and 370 includes virtual network functions (representatively indicated by reference numeral 420) including, for example, radio access functions and core network functions. For example, the core network and RAN slicing related network functions are described in the 3GPP standards. Operations of the WAN slice controller are described in more detail in the text accompanying FIGS. 10-13. Operations of the RAN slice controller are described in more detail in the text accompanying FIGS. 19 and 20. While each slice controller may perform functions independently from other systems, they are linked to effectuate end-to-end 5G network slicing as discussed below.

As shown in FIG. 4, the service manager and orchestrator 395 supports a WAN orchestrator 425 that is configured for responsibility for WAN resource control and management. An SDN orchestrator 430 provides programmatic capabilities for automating behaviors and policies in the 5G network including the control of switches and routers that support various services and applications. An NFV (network function virtualization) orchestrator 435 is responsible for network service/network function lifecycle management to deploy virtual network functions among slices for core slicing. An end-to-end (E2E) orchestrator 440 is configured to provide orchestration services for automated slicing across domains including the RAN, mobile core, and transport network.

Figure 5:
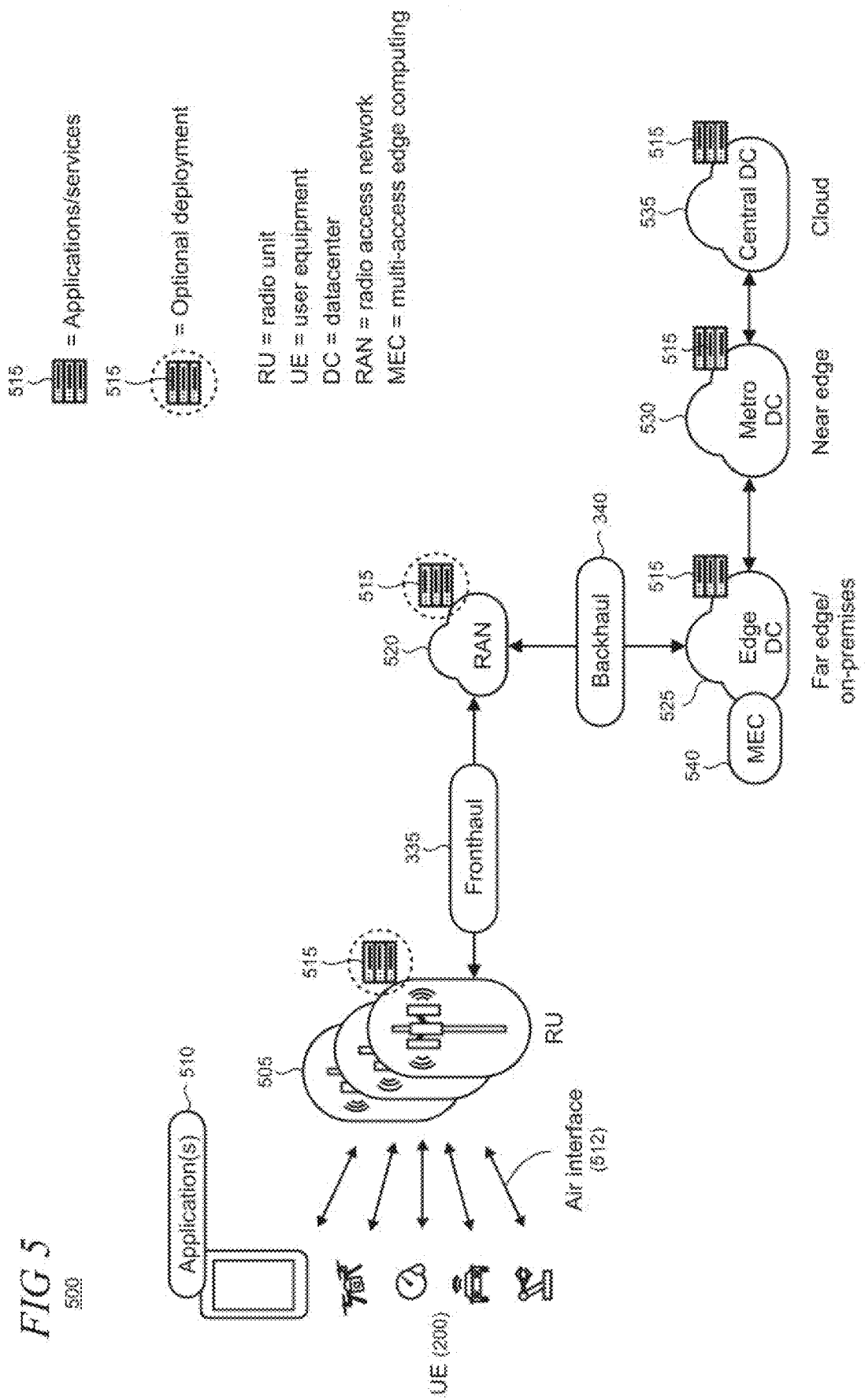
FIG. 5 shows illustrative physical infrastructure in a 5G network architecture.

FIG. 5 shows illustrative physical infrastructure in a 5G network 500. Multiple instances of a radio unit (RU) 505 are configured to interact with a diverse population of UE 200 over an air interface 512 of the 5G network. Each UE typically includes one or more local/client applications 510 or client-side software/firmware component that is arranged to interface with one or more remote application servers, service providers, or other resources (collectively indicated by reference numeral 515) and thus require network connectivity to such remote facilities.

The RUs are coupled by the mobile fronthaul 335 to a RAN 520. The RAN is coupled by the mobile backhaul 340 to one or more data centers (DCs). In this illustrative example, the DCs comprise an edge DC 525, a metro DC 530, and a central DC 535. In some networking literature, the edge DC may be referred to as a far edge or on-premises DC. The metro DC may be referred to as a near edge DC, and the central DC may be referred to as the cloud. In some implementations, the edge DC may support multi-access edge computing (MEC) functions 540.

The application servers 515 can be located at various points in the network architecture 500 to meet technical requirements and traffic demands. Typically, the application servers will be physically located closer to the UE 200 in cases where latency is sought to be minimized. However, an operator's application server location criteria may also consider factors such as management ease, scalability, and security, among other factors. In some implementations, an operator may optionally deploy application servers and other resources in the RAN 520 or RU 505, as indicated by the dashed circles in FIG. 5.

Figure 6:
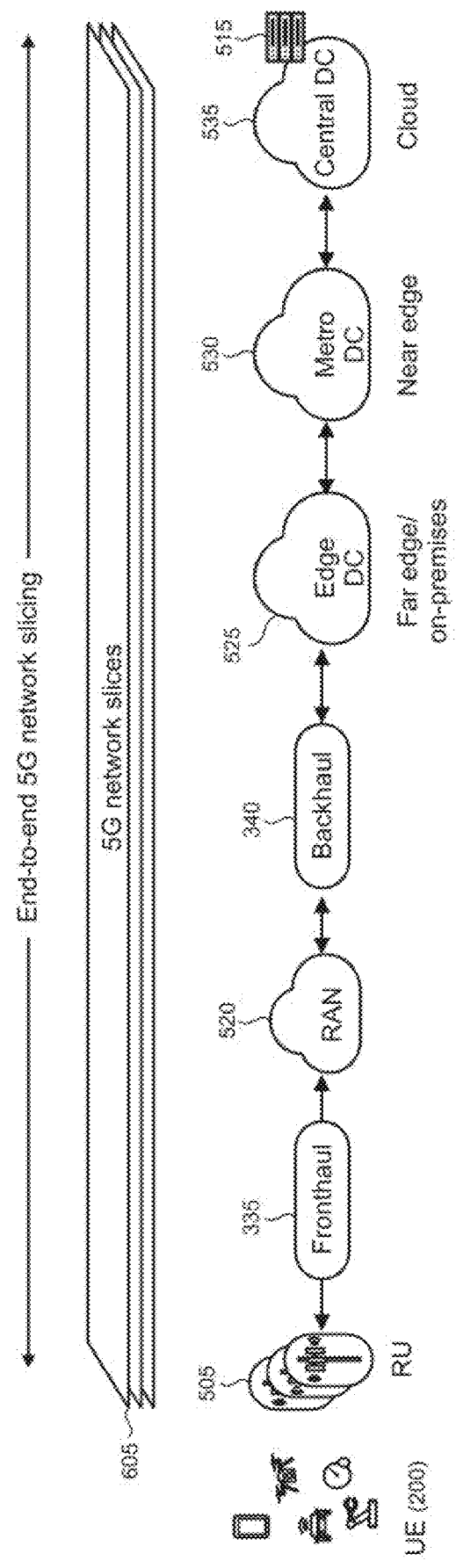
FIG. 6 shows illustrative 5G network slices that extend end-to-end on a 5G network.

FIG. 6 shows illustrative 5G network slices 605 that extend end-to-end on a 5G network 500. As shown, the slicing construct used at the RAN 520 is extended through to WAN infrastructure that may be utilized as the transport network portion 350 (FIG. 3) of the 5G network. The term "WAN" as used herein generally refers to a combination of physical transport media and switching and/or routing functionalities, however, the term may also have alternative meanings depending on appliable context, or when given an explicit definition. The physical transport media typically comprise fiber optic systems but are not necessarily limited to such systems. Likewise, switching/routing can be performed in various portions of the 5G network, including DCs, but such functions are not necessarily limited to performance in DCs. A given WAN can be provided, for example, by one or more of cloud service provider, mobile network operator, internet service provider, TN service provider, PSTN (public-switched telecommunications network) provider, network service provider, telecommunications provider, backbone provider, cable television provider, various combinations thereof, or the like.

Figure 7:
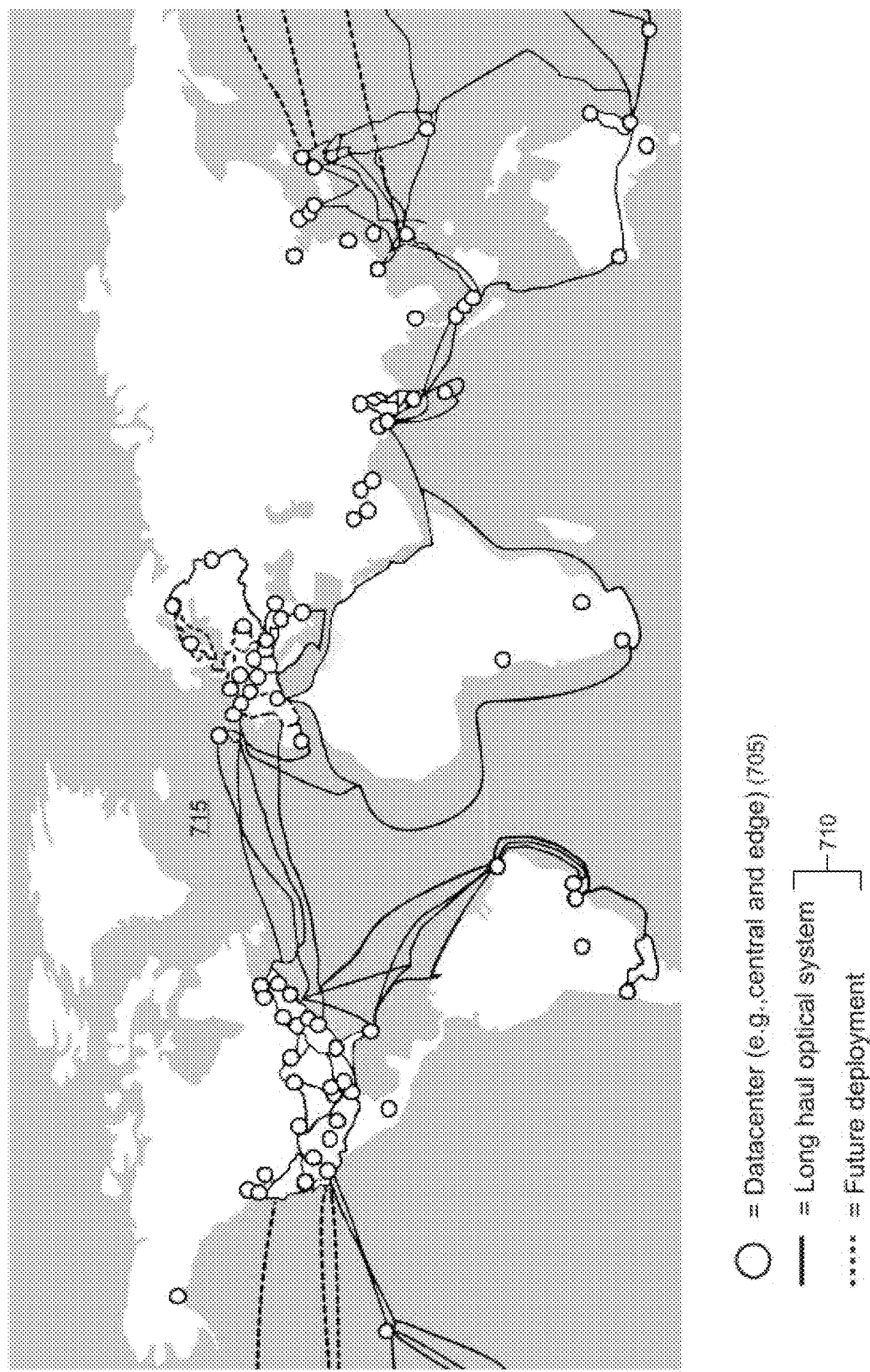
FIG. 7 is an illustrative map of data centers (DCs) comprising a wide area network (WAN) on a global basis.

WANs can be operated on a local, regional, and/or global basis. FIG. 7 is an illustrative map 700 of data centers (DCs) 705 and long-haul optical systems 710 that comprise a global WAN 715. Within metropolitan areas and across the WAN, a WAN provider typically must offer extremely high bandwidths with near-perfect service availability and appropriate latencies to meet customer demands for diverse types of data, including, for example, enterprise cloud applications and email, VoIP (voice over internet protocol), streaming video, IoT, search, and cloud storage. Accordingly, DCs are distributed through a given WAN topology and interconnected with optical transport systems such as long-haul optical systems. Such WAN configurations may support an application space which may be called "data center interconnect" (DCI).

Within a given geographic region, separation between DCs 705 must be far enough to avoid multiple site failures during catastrophic events, but the physical network connecting them cannot exceed the round-trip latency requirements of the application layer, typically less than a few milliseconds. All distributed DCs in the regional network are connected to each other over numerous diverse point-to-point DCI systems, carrying hundreds of 100G inter-switch links on each, allowing the region to operate effectively as one mega data center with petabits per second of low-latency inter-DC capacity. Between regions, where fiber resources are more constrained by an order of magnitude or more, the criteria for optimization are different: traffic is less latency-sensitive, distances are much greater, and spectral efficiency becomes critical.

In some cases, the optical transport systems can be OLS-based (open line system) with optical sources residing directly on routers to provide systems that are optimized for point-to-point inter-region connectivity capable of transporting optical signals over long distances with maximal optical signal-to-noise ratio (OSNR) and spectral efficiency. By decoupling the optical sources from the line system, the WAN provider can typically control the end-to-end link budgeting and SLAs for the deployed infrastructure and can accordingly operate it with tighter margins. To provide high-availability, high-performance services to customers, the WAN will typically be configured to have compute and storage presence as close to the customers as economics allow.

Figure 8:
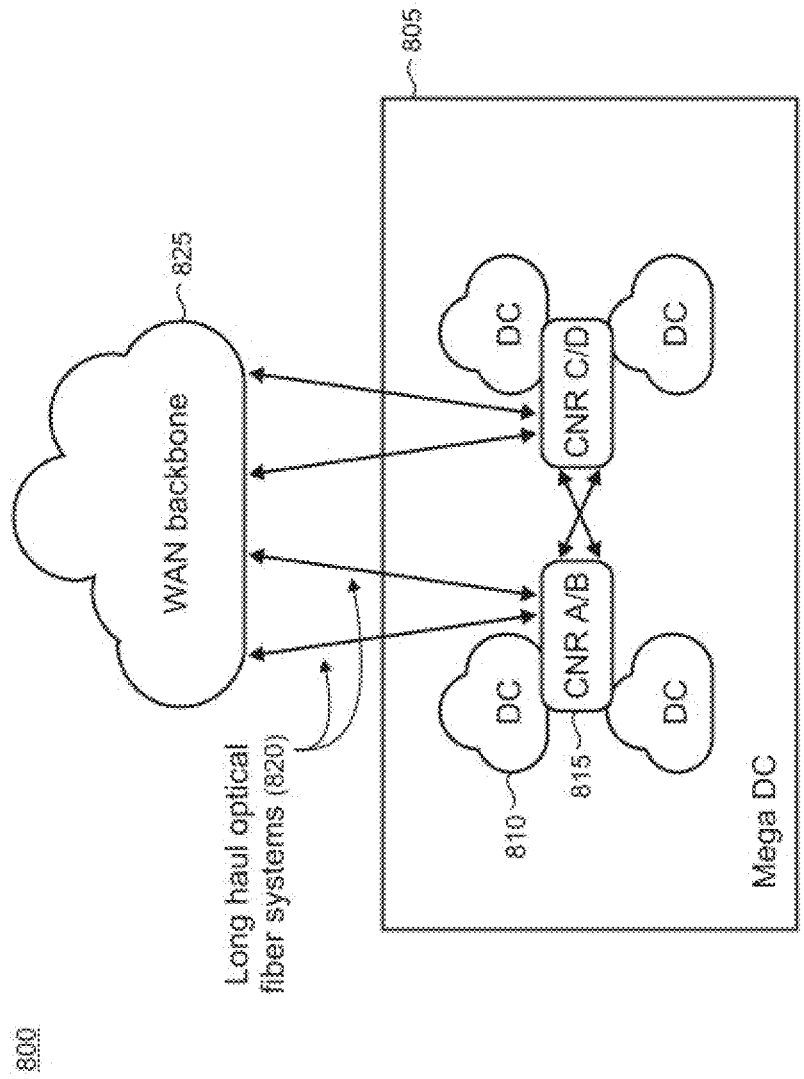
FIG. 8 shows an illustrative example of a mega-DC architecture.

FIG. 8 shows an illustrative example of a mega-DC architecture 800 which may be utilized to establish a regional presence in which large singular campus facilities are utilized. The mega-DC campus 805 may comprise multiple DCs 810 that are interconnected with standardized (i.e., "gray") optics and/or bulk fiber through core network rooms (CNRs) 815 designated by letters A, B, C, and D. The CNRs are coupled via long haul optical fiber systems 820 to a WAN backbone 825. The configuration of the optical fiber systems can vary. A typical system may support, for example, 16 fiber-pairs with 40-80 wavelengths. Thus, such campus-based regions can generally provide capacity to support a given geography with local, low-latency resources that may be scaled up to the size of a mega-DC.

Figure 9:
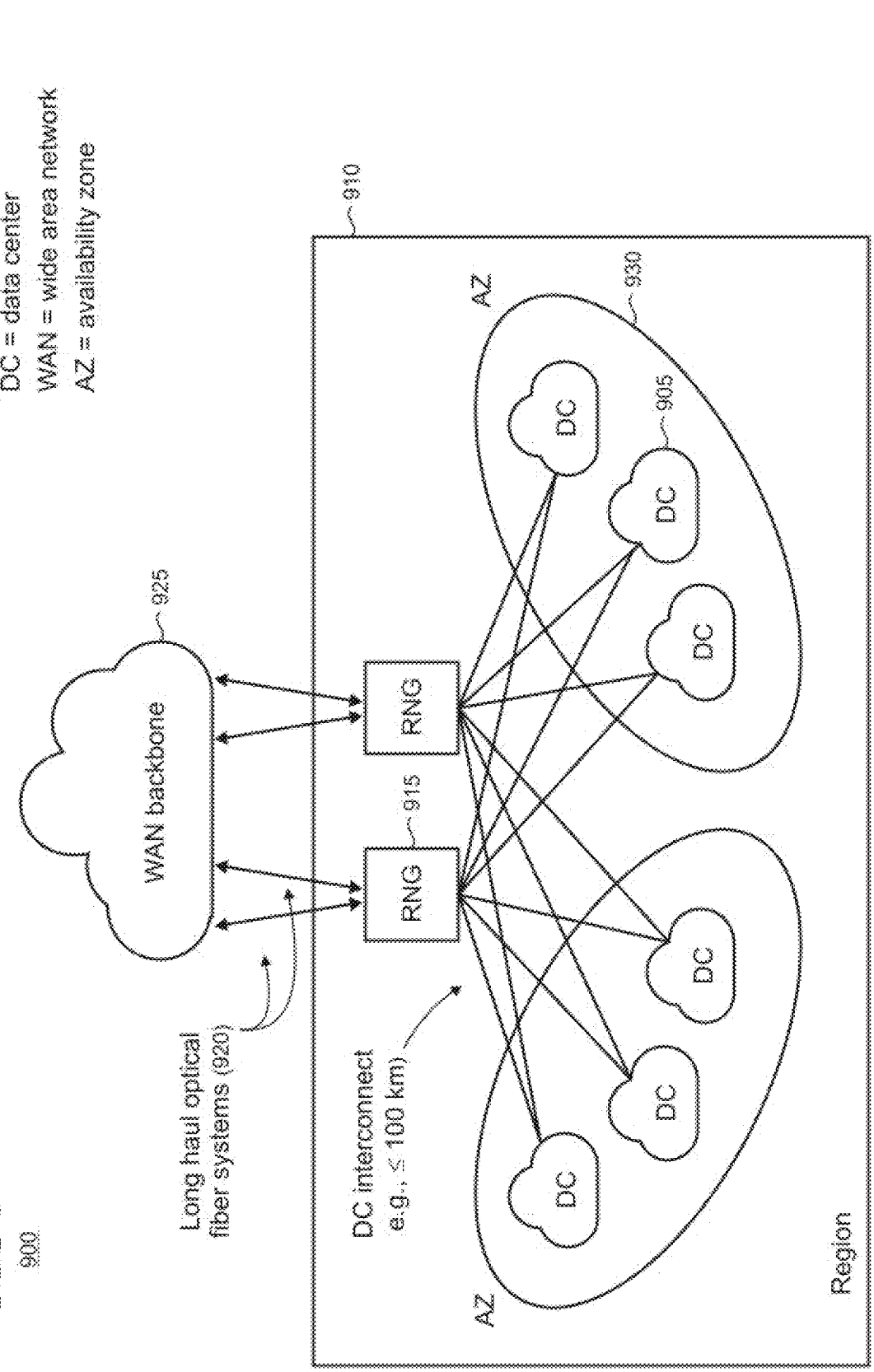
FIG. 9 shows an illustrative example of a regional DC architecture.

FIG. 9 shows an illustrative example of a regional DC architecture 900 that may facilitate the distribution of DCs 905 throughout a wider geographic area within a region 910. Multiple campuses may be utilized to effectively extend the logical topology that is typically observed inside a DC (referred to as a data center Clos fabric) across a metropolitan area. In an illustrative example, diverse facilities are designated as regional network gateways (RNGs) 915. DCs are redundantly connected back to each of the RNGs to ensure that the server-to-server latency remains sufficiently low to meet application layer requirements. For example, the architecture may utilize an interconnect configuration in which no single DC to RNG path exceeds 100 km. The RNG are coupled via long haul optical fiber systems 920 to a WAN backbone 925. The geographical diversity of the individual DCs gives rise to availability zones (AZs) 930 which provide regional resiliency under catastrophic failure conditions within a given DC site.

To implement the present dedicated WAN slicing, the WAN slice controller 410 (FIG. 4) may be configured to select particular nodes of a WAN to form a WAN slice. A given WAN slice may typically be configured as a collection of nodes in which each node provides a point of data ingress or egress in the WAN. The collection of nodes comprises a slice path that defines a given WAN slice that provides dedicated capacity for point-to-point data transport. A node can be located within a DC, but nodes are not necessarily limited to exclusively DC co-location.

Figure 10:
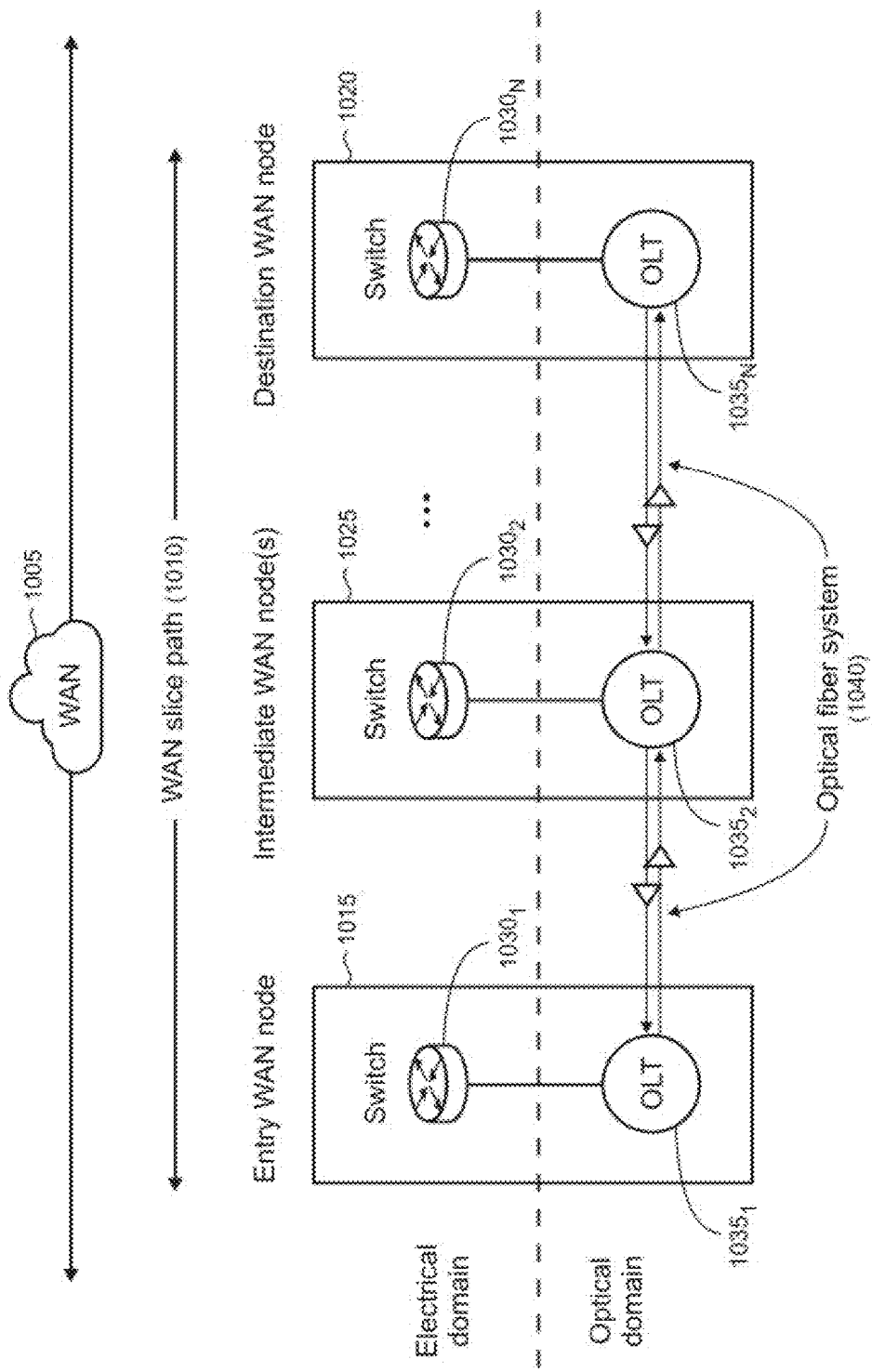
FIG. 10 shows an illustrative subset of WAN nodes that form a WAN slice path comprising an entry WAN node, a destination WAN node, and zero or more intermediate WAN nodes.

FIG. 10 shows an illustrative subset 1000 of nodes in a WAN 1005 that form a WAN slice path 1010 comprising an entry WAN node 1015, a destination WAN node 1020, and zero or more intermediate WAN nodes, representatively indicated by reference numeral 1025. It will be appreciated that the entry and destination nodes are selected to meet the particular geographic requirements of a given customer. The intermediate WAN nodes may be selected by the WAN slice controller 410 (FIG. 4) or some other network component using a suitable methodology to identify an optimal path that minimizes slice path length and/or the number of intermediate nodes traversed while ensuring that sufficient data capacity and resilience is provided. In general, the WAN slice path is selected, and the nodes are configured by the WAN slice controller, to enable traffic to be carried by components in optical line terminals (OLTs) 1035 and optical fiber system 1040 to thereby maintain strong WAN slice isolation. The data traffic thus remains in the optical domain, where possible, to avoid costly regeneration and re-provisioning in a switch 1030 in the electrical domain.

Figure 11:
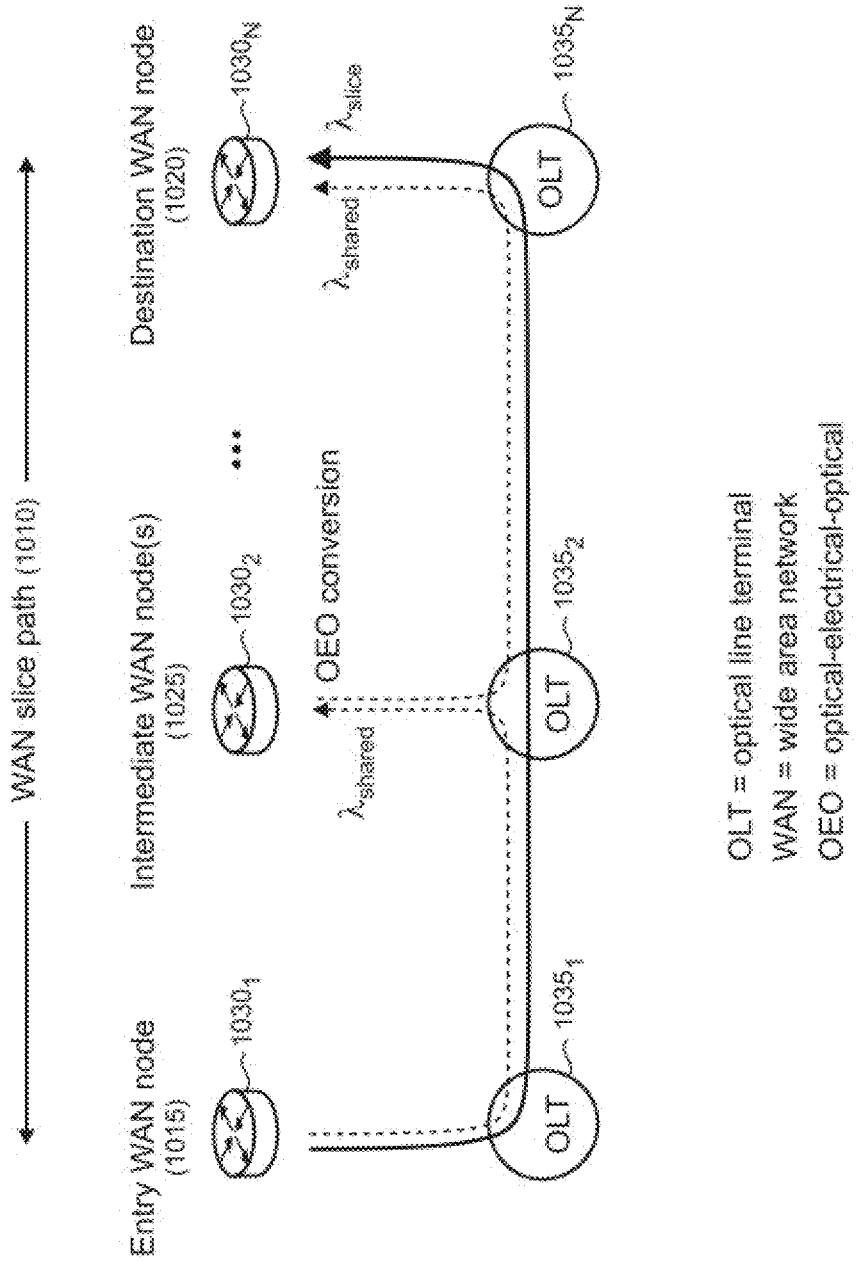
FIG. 11 shows a discrete wavelength in a dedicated WAN slice that remains in the optical domain as it traverses the WAN slice path.

As shown in FIG. 11, conventionally, data carried on a wavelength $\lambda_{shared}$ that is shared by non-dedicated traffic on the WAN 1005 undergoes regeneration at each intermediate WAN node 1025. The data undergoes OEO conversion at switch 1030 which may comprise, for example, a layer 2 (L2) switch, layer 3 switch, L2/L3 switch, router, a combination thereof, or some other suitable switch that is configured for operating in the electrical domain. By comparison, traffic on the dedicated wavelength $\lambda_{slice}$ for the WAN slice bypasses the intermediate WAN node and terminates at the destination WAN node 1020.

It may be appreciated that errors can increase with longer optical fiber paths due to accumulated signal attenuation and dispersion which are not corrected when bypassing regeneration in the intermediate nodes. The WAN slice controller 410 (FIG. 4) can provision data traffic on the dedicated WAN slice at a suitable downward-adjusted data rate in some cases to accommodate for longer slice path lengths, for example, by using a lower order modulation format or other suitable technique. However, the chosen WAN slice path must enable the slice to meet applicable QoS guarantees for each dedicated wavelength that is contiguous across all WAN nodes. Accordingly, node selection and configuration processes will typically need to balance data rates with path lengths. Bypass may not be appropriately utilized in one or more WAN nodes in a slice such that OEO conversion, regeneration, and/or re-provisioning costs may be justified in scenarios where slice performance is negatively impacted by the bypass beyond some threshold.

Figure 12:
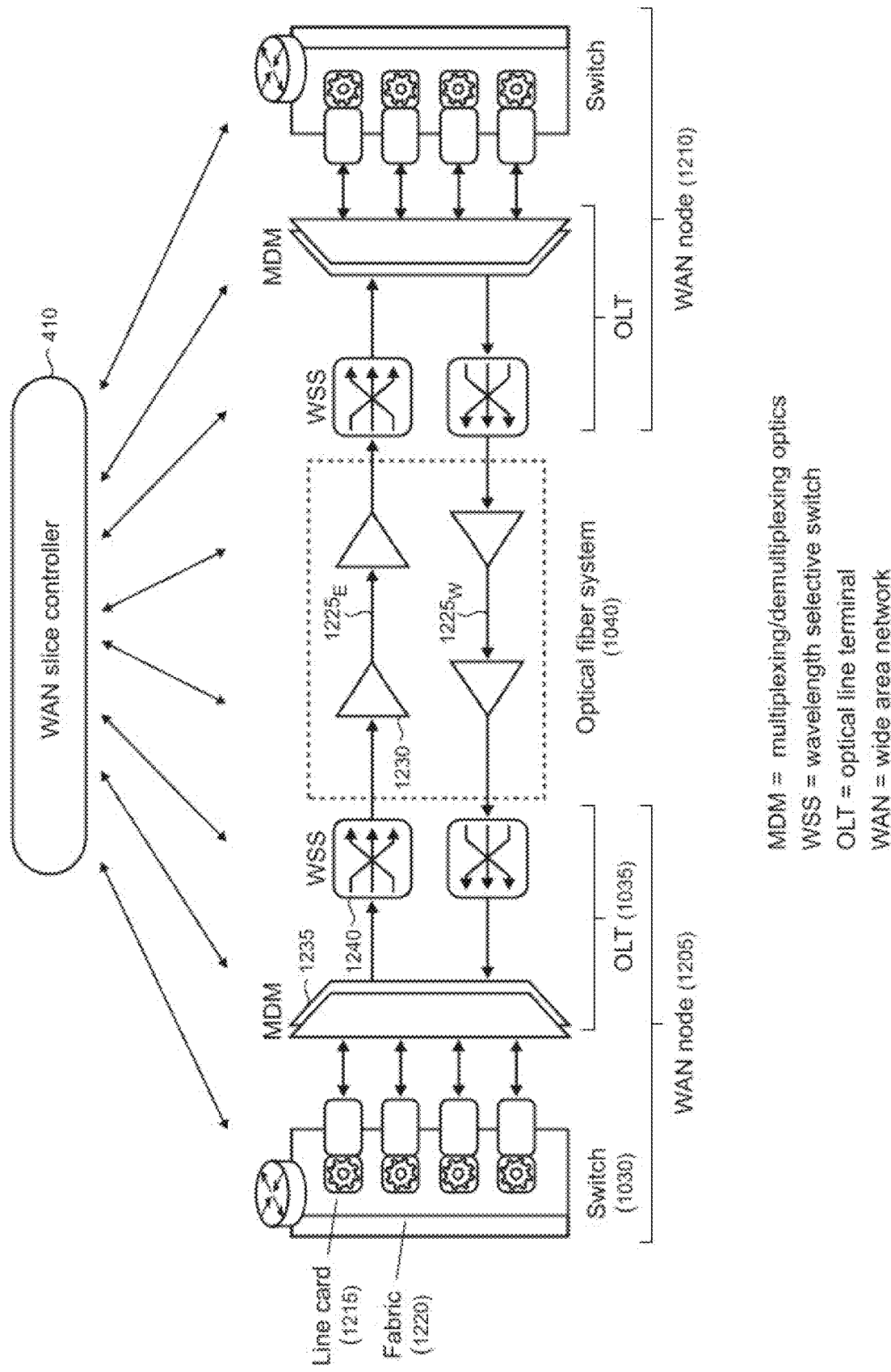
FIG. 12 shows details of illustrative network elements that may be utilized in a WAN node.

FIG. 12 shows details of illustrative network elements that may be utilized in each of two adjacent WAN nodes 1205 and 1210 in a WAN slice path (not shown). Each WAN node includes a switch 1030 comprising a plurality of line cards 1215 that interoperate through a fabric 1220 in the electrical domain. The line cards can comprise bandwidth-variable transceivers that function as DWDM (dense wavelength division multiplexing) optical sources. Such sources can comprise, for example, router-based integrated coherent optics (ICO) or other suitable equipment that may be configured to support multiple modulation formats and bit rates (e.g., 100-200 Gb, in 25 Gb increments) to suit characteristics of the optical fiber system 1040 defined, for example, by OSNR. The optical sources may support, for example, quadrature phase shift keying (QPSK), 8-ary quadrature-amplitude modulation (8QAM), and 16QAM modes at 100, 150, and 200 Gb/s payload rates, respectively. The optical fiber system 1040 may typically comprise multiple optical fiber-pairs 1225 and optical amplifiers 1230 such as erbium-doped fiber amplifiers (EDFAs) and/or Raman amplifiers.

The switch 1030 interfaces with the OLT 1035 that is configured to operate in the optical domain. The OLT includes an MDM (multiplexing/demultiplexing optics) 1235 and a WSS (wavelength selective switch) 1240 and may include optical amplifiers (not shown). The WSS may comprise, for example, one or more instances of a ROADM (reconfigurable optical add/drop multiplexer) that may operate as an optical switching engine. The WAN slice controller 410 may be configured to interoperate with some or all of the network elements in the WAN nodes and optical fiber system to provide the present dedicated WAN slices.

Figure 13:
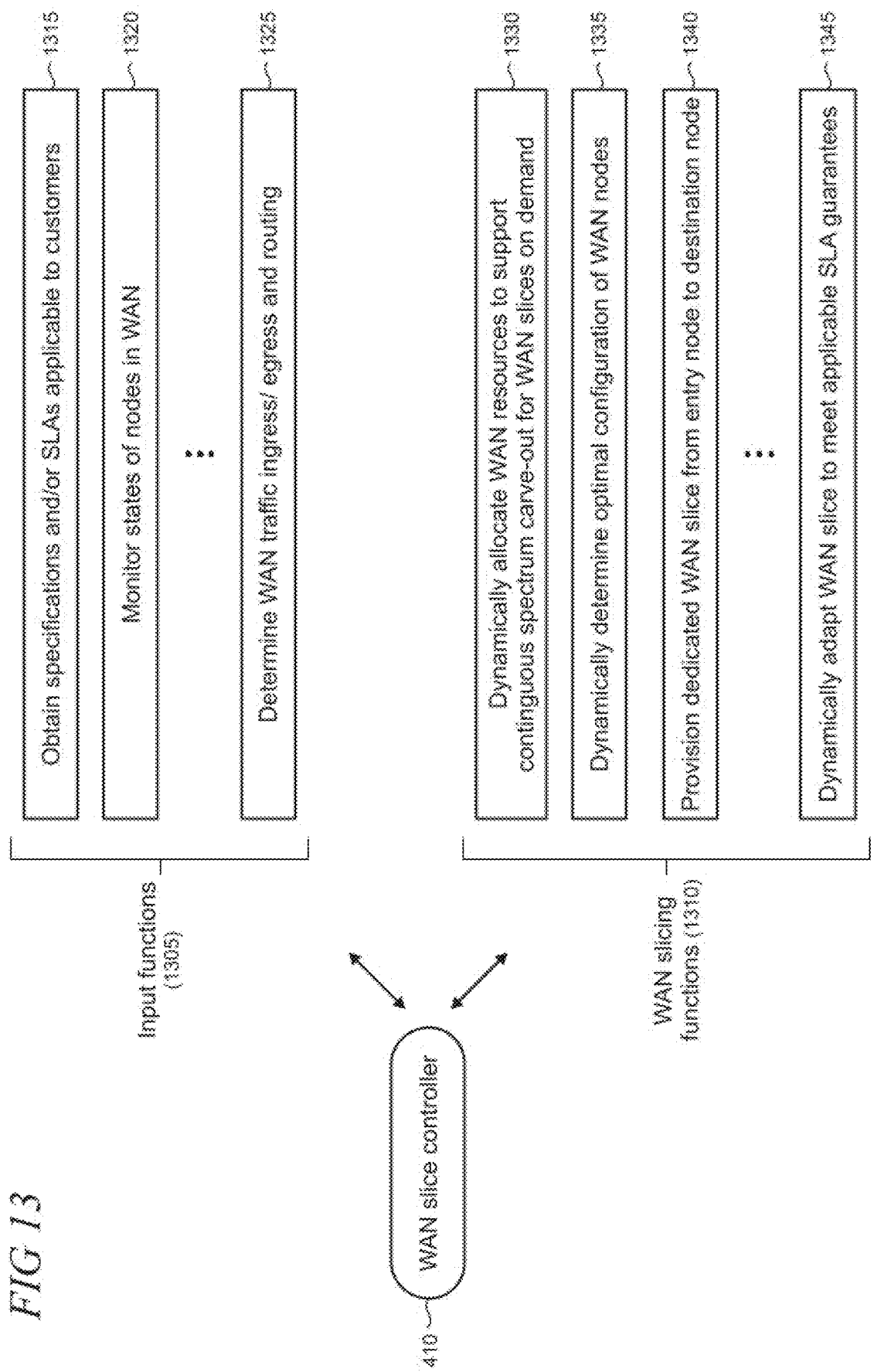
FIG. 13 shows illustrative input and slicing functions that may be performed by the WAN slice controller.

FIG. 13 shows illustrative input functions 1305 that the WAN slice controller 410 may perform to obtain input data and information that is considered for WAN slicing. FIG. 13 also shows illustrative WAN slicing functions 1310 that the WAN slice controller may perform to provision, adapt, and manage dedicated WAN slices and the overall WAN infrastructure in some cases. The inputs and slicing functions are illustrative and not limiting and other inputs and slicing functions may be utilized to meet the needs of a particular implementation of the present dedicated WAN slicing. Not all of the input or slicing functions are required to be performed in every implementation of the present dedicated WAN slicing. It is also emphasized that the input and slicing functions shown have no particular order of operation and therefore FIG. 13 should not be viewed as a flowchart.

The WAN slice controller 410 may perform input function 1315 to receive specifications and/or SLAs that may be applicable to a given customer. In some implementations, the specifications and SLAs can refer to characteristics of a dedicated WAN slice. In alternative implementations, the specifications and SLAs can refer to characteristics of an end-to-end slice. Such specifications and SLAs can define slice requirements, including, for example, but not limited to, slice geography, capacity and throughput, availability, reliability, latency, and other performance, technical, and/or commercial requirements. In cases for which end-to-end slicing requirements are applicable, the WAN slice controller can be adapted for interoperation with other suitable SDN slicing management functions such as the RAN slice controller 405 and core slice controller 415 shown in FIG. 4 and described in the accompanying text.

The WAN slice controller 410 may perform input function 1320, monitoring the state of WAN nodes, to collect information and metrics from the network elements about the current network conditions, connectivity, and user plane and control plane data flow among the elements and WAN nodes. Typical metrics used to express network state include, for example, latency, packet loss indicators, jitter, bandwidth, and throughput, among other suitable metrics. Diagnostic data, analytics, and/or log data may also be collected from network elements as a part of the monitoring of individual node and overall WAN states.

Input function 1325 comprises the WAN slice controller 410 determining data ingress to and egress from WAN nodes and traffic routing throughout the 5G network in general and the WAN in particular. As shown by slicing function 1330, the WAN slice controller may utilize knowledge of network routing and WAN state to dynamically carve out optical spectrum to thereby instantiate a dedicated WAN slice on demand. The carve-out may comprise selecting one or more wavelengths for the dedicated slice, $\lambda_{slice}$, and determining nodes in the slice path so that applicable slice specifications and SLA guarantees may be achieved with minimal disruption to other WAN traffic that is not carried on the dedicated slice.

Slicing function 1335 may comprise, in some implementations, a configuration of the WAN slice controller 410 to utilize a network optimization model, or other suitable functionality to dynamically determine an optimal configuration of WAN nodes. Such optimization can be expected to enhance responsiveness to on-demand requests for WAN slicing and/or end-to-end slicing. Such optimization may further streamline setup and provisioning of WAN network elements to implement dedicated wavelength services for customers.

Decision variables may include selection of one or more dedicated wavelengths and the WAN slice path. The objective function of the optimization model may include maximizing the availability of optical and router ports by bypassing nodes along the WAN slice path. It may be appreciated that constraints for the optimization model may deal with, for example, demand along all WAN routes for all traffic types (e.g., dedicated and non-dedicated), applicable QoS and SLA guarantees, capacity of a given WAN slice, total capacity of the WAN, the inherent bidirectionality of traffic capacity on the WAN, and network flow conservation. The decision variables and constraints described herein with respect to an optimization model are intended to be illustrative and it may be appreciated that various different models, variables, and constraints may be appropriately utilized to meet the needs of a particular implementation of dedicated WAN slicing.

Additional constraints may also arise, in some applications, by the interfaces between the WAN and the RAN and/or mobile core when implementing an end-to-end slicing construct. Non-technical constraints relating to legal, commercial, and policy factors may also limit possible values of the decision variables. For example, a WAN slice path may be limited to remaining within particular geographic boundaries, for example, due to privacy policies, government regulations, and the like.

Historical data may be collected and utilized in some cases by a predictive model. For example, analyses of a customer's historical traffic patterns on the 5G network, including the WAN and other network portions, may enable prediction of network conditions and traffic loading that are applicable to the WAN and its constituent slices. The WAN slice controller 410 can employ the predictive and/or optimization models to enhance responsiveness to on-demand dedicated WAN slice requests, for example, by pre-provisioning capacity and/or other appropriate resources in advance of anticipated demands.

The optimization and/or predictive models, or another suitable node and path selection methodology, may be utilized to pre-compute shortest paths between particular entry and destination nodes with maximum instances of optical bypass in intermediate nodes. The WAN slice controller 410 can select from among the pre-computed paths according to current or predicted traffic loads and/or WAN state, for example, as measured by OSNR of each of the different available slice paths.

Slicing function 1340 may comprise the WAN slice controller provisioning dedicated capacity for the selected wavelength on a WAN slice from entry to destination node, and any intermediate nodes in between. The provisioning may comprise configuring the WAN slice network elements to instantiate data transport services to the customer on a dedicated wavelength that is contiguously-implemented across the nodes in the WAN slice path.

Slicing function 1345 may comprise the WAN slice controller 410 dynamically adapting a WAN slice as necessary to meet applicable SLA guarantees. For example, terminals at the WAN nodes can adjust modulation formats and/or data transmission rates to meet performance and capacity requirements for the WAN slice as the WAN state and traffic loads change or are predicted to change. Adaptations may also be implemented for non-dedicated traffic such as changing network provisioning or QoS when appropriate. For example, if network conditions dictate, non-dedicated traffic may be downgraded to best effort or non-guaranteed service to maintain a QoS guarantee for a dedicated WAN slice.

Adaptations may also include routing changes or instantiation of new WAN slice paths. In typical implementations, WAN state and associated traffic demand patterns will change in a predictable manner to enable effective modeling and control schemes to be implemented, such as pre-provisioning network elements and dedicated capacity. In cases of unpredictable events, such as fiber cuts and other network failures, dynamic resource allocation may be implemented among dedicated and non-dedicated traffic types.

Figure 14:
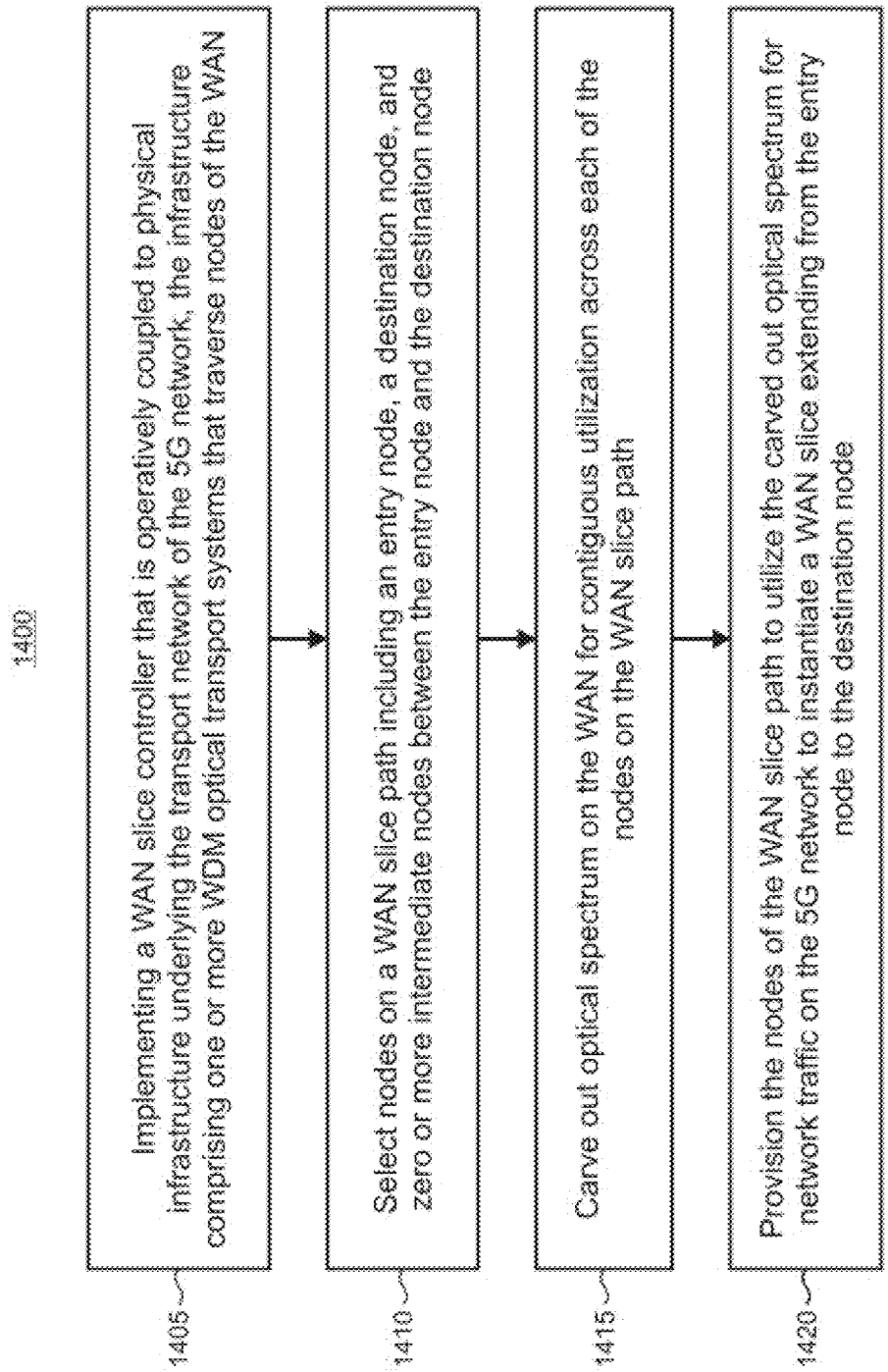
FIGS. 14, 15, and 16 show illustrative methods that may be performed when implementing the present dedicated WAN slices.

FIG. 14 is a flowchart of an illustrative method 1400 that may be performed by a computing device operating in a WAN in which the WAN provides at least a portion of a transport network of a 5G network. Unless specifically stated, methods or steps shown in the flowchart blocks and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized.

At block 1405, a WAN slice controller is implemented that is operatively coupled to physical infrastructure underlying the transport network of the 5G network, the infrastructure comprising one or more wavelength division multiplexed (WDM) optical transport systems that traverse nodes of the WAN. At block 1410, nodes are selected on a WAN slice path including an entry node, a destination node, and zero or more intermediate nodes between the entry node and the destination node.

At block 1415, optical spectrum is carved out on the WAN for contiguous utilization across each of the nodes on the WAN slice path. At block 1420, nodes of the WAN slice path are provisioned to utilize the carved out optical spectrum for network traffic on the 5G network to instantiate a WAN slice extending from the entry node to the destination node.

Figure 15:
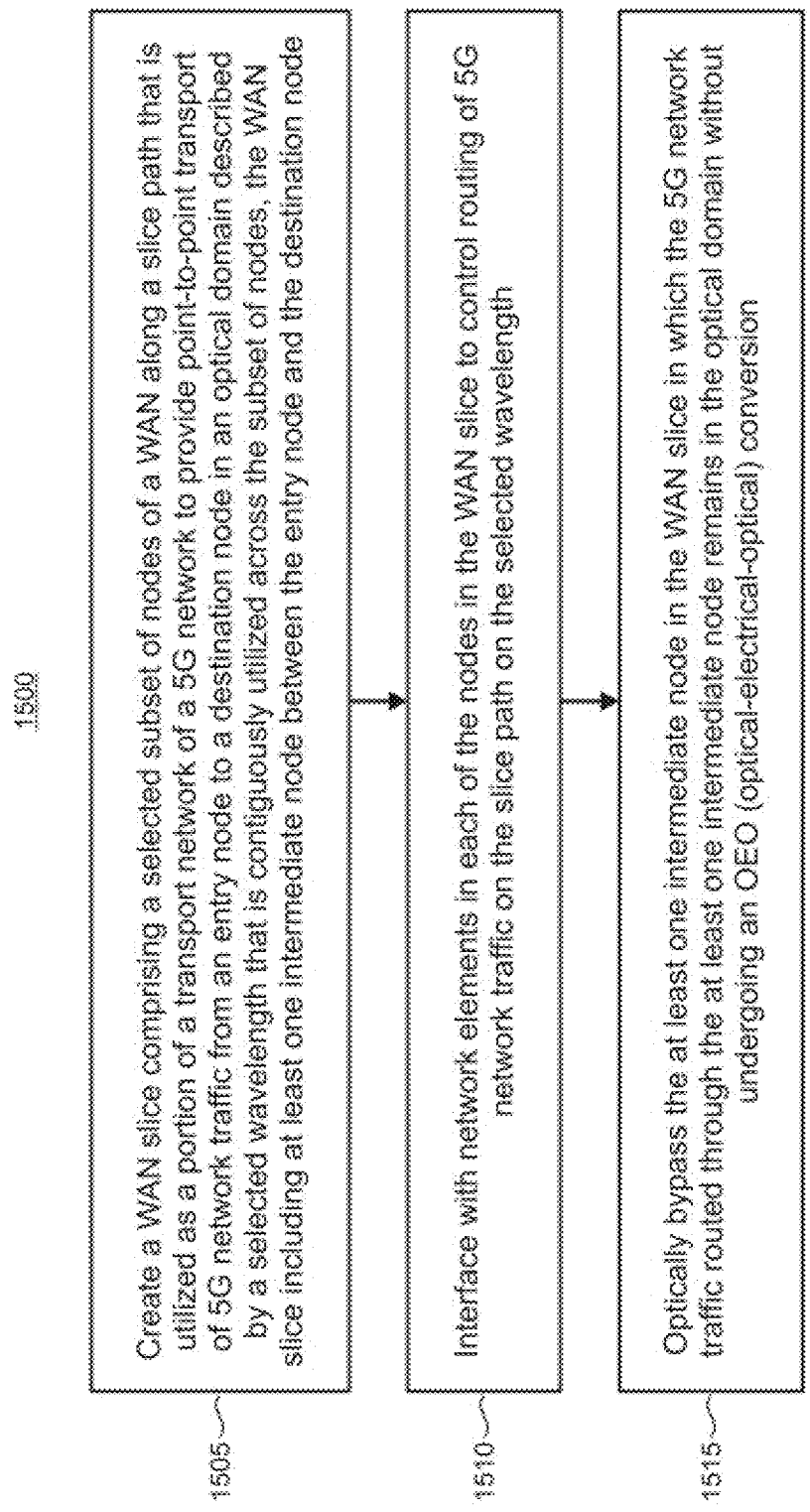

FIG. 15 is a flowchart of an illustrative method 1500 that may be performed by a computing device operating in a 5G network. At block 1505, a WAN slice comprising a selected subset of nodes of a WAN along a slice path that is utilized as a portion of a transport network of a 5G network is created to provide point-to-point transport of 5G network traffic from an entry node to a destination node in an optical domain described by a selected wavelength that is contiguously utilized across the subset of nodes. The WAN slice includes at least one intermediate node between the entry node and the destination node. At block 1510, an interface is established with network elements in each of the nodes in the WAN slice to control routing of 5G network traffic on the slice path on the selected wavelength. At block 1515, at least one intermediate node in the WAN slice is optically bypassed in which the 5G network traffic routed through the at least one intermediate node remains in the optical domain without undergoing an OEO conversion.

Figure 16:
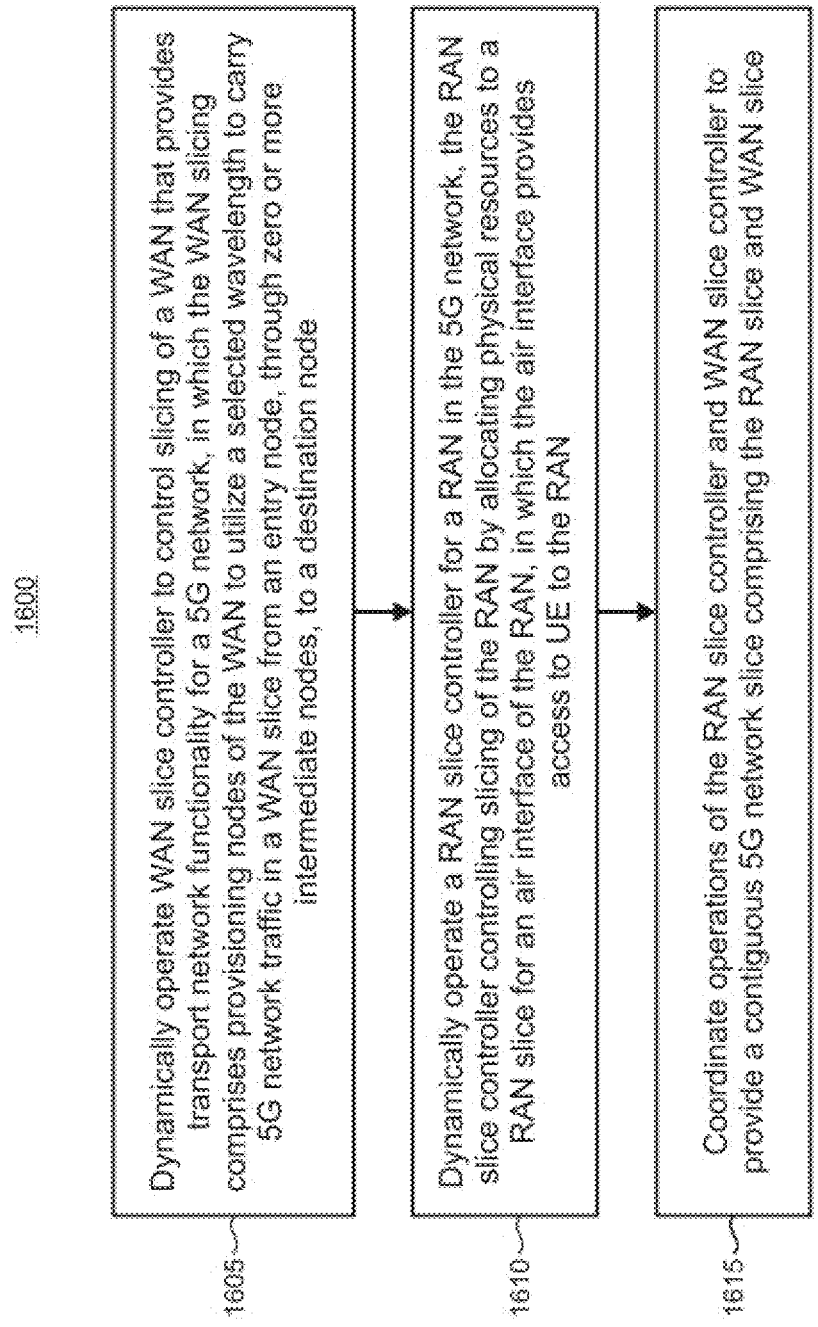

FIG. 16 is a flowchart of an illustrative method 1600 that may be performed by a computing device operating in a 5G network. At block 1605, a wide area network (WAN) slice controller is dynamically operated to control slicing of a WAN that provides transport network functionality for a 5G (fifth generation) network, in which the WAN slicing comprises provisioning nodes of the WAN to utilize a selected wavelength to carry 5G network traffic in a WAN slice from an entry node, through zero or more intermediate nodes, to a destination node. At block 1610, a radio access network (RAN) slice controller for a RAN in the 5G network is dynamically operated in which the RAN slice controller controls slicing of the RAN by allocating physical resources to a RAN slice for an air interface of the RAN, in which the air interface provides access to user equipment (UE) to the RAN. At block 1615, operations of the RAN slice controller and WAN slice controller are coordinated to provide a contiguous 5G network slice comprising the RAN slice and WAN slice.

Figure 17:
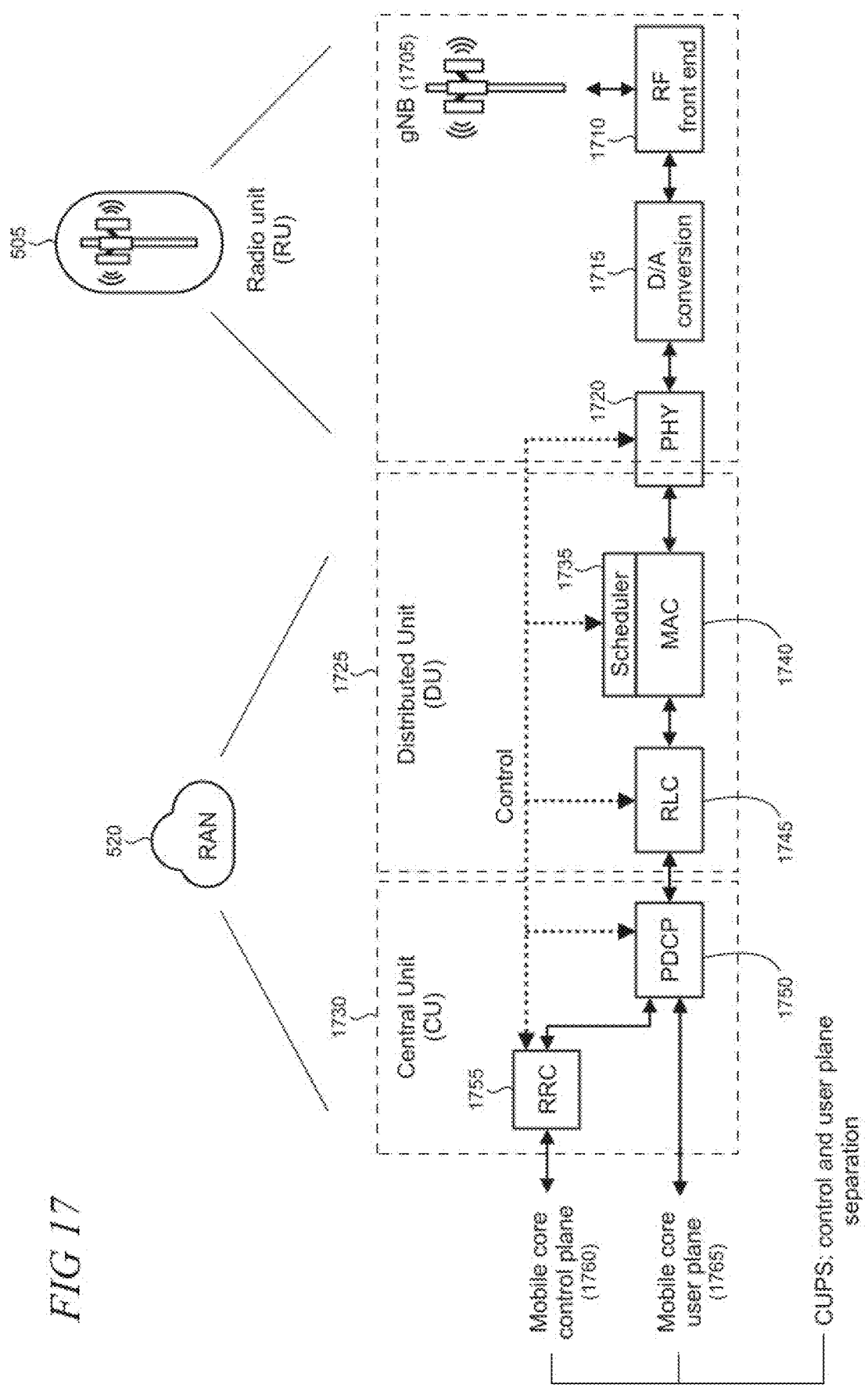
FIG. 17 shows an illustrative 5G radio access network (RAN) and radio unit (RU)

FIG. 17 shows functional blocks of the RAN 520 and RU 505. The RU comprises radio transmission points, for example, a next generation Node B, gNB 1705, which handles radio communications with the UE. The gNB is serially coupled to a radio frequency (RF) front end 1710, a digital to analog (D/A) conversion unit 1715, and a portion of the functionality of the physical (PHY) layer 1720 as described in the OSI Open Systems Interconnection model.

Under 3GPP and O-RAN (Open RAN) Alliance, the processing pipeline of the RAN 520 is split into a distributed unit (DU) 1725, and a central unit (CU) 1730. The DU is responsible for real-time layers 1 and 2 (L1 and L2) scheduling functions, and the CU is responsible for non-real-time, higher L2 and L3 functions. Accordingly, the DU comprises a scheduler 1735 located on top of a MAC (Medium Access Control) layer component 1740, an RLC (radio link control) layer component 1745, and parts of a PHY (physical) layer component 1720. The MAC layer component is responsible for buffering, multiplexing, and demultiplexing segments, including all real-time scheduling decisions about which segments are transmitted when. It is also able to make a "late" forwarding decision (i.e., to alternative carrier frequencies, including Wi-Fi, for example). The PHY layer component is responsible for coding and modulation.

The CU 1730 is configured with a PDCP (Packet Data Convergence Protocol) layer component 1750 and RRC (Radio Resource Control) layer component 1755. The PDCP layer component is responsible for compressing and decompressing IP headers, ciphering and integrity protection, and making an "early" forwarding decision (i.e., whether to send the packet down the pipeline to the UE or forward it to another base station). The RRC layer component is responsible for configuring the coarse-grain and policy-related aspects of the RAN processing pipeline. The RRC layer component interfaces with the control plane 1760 while the PDCP layer component interfaces with the user plane 1765 to thereby implement the "CUPS" feature of 5G (control and user plane separation).

Figure 18:
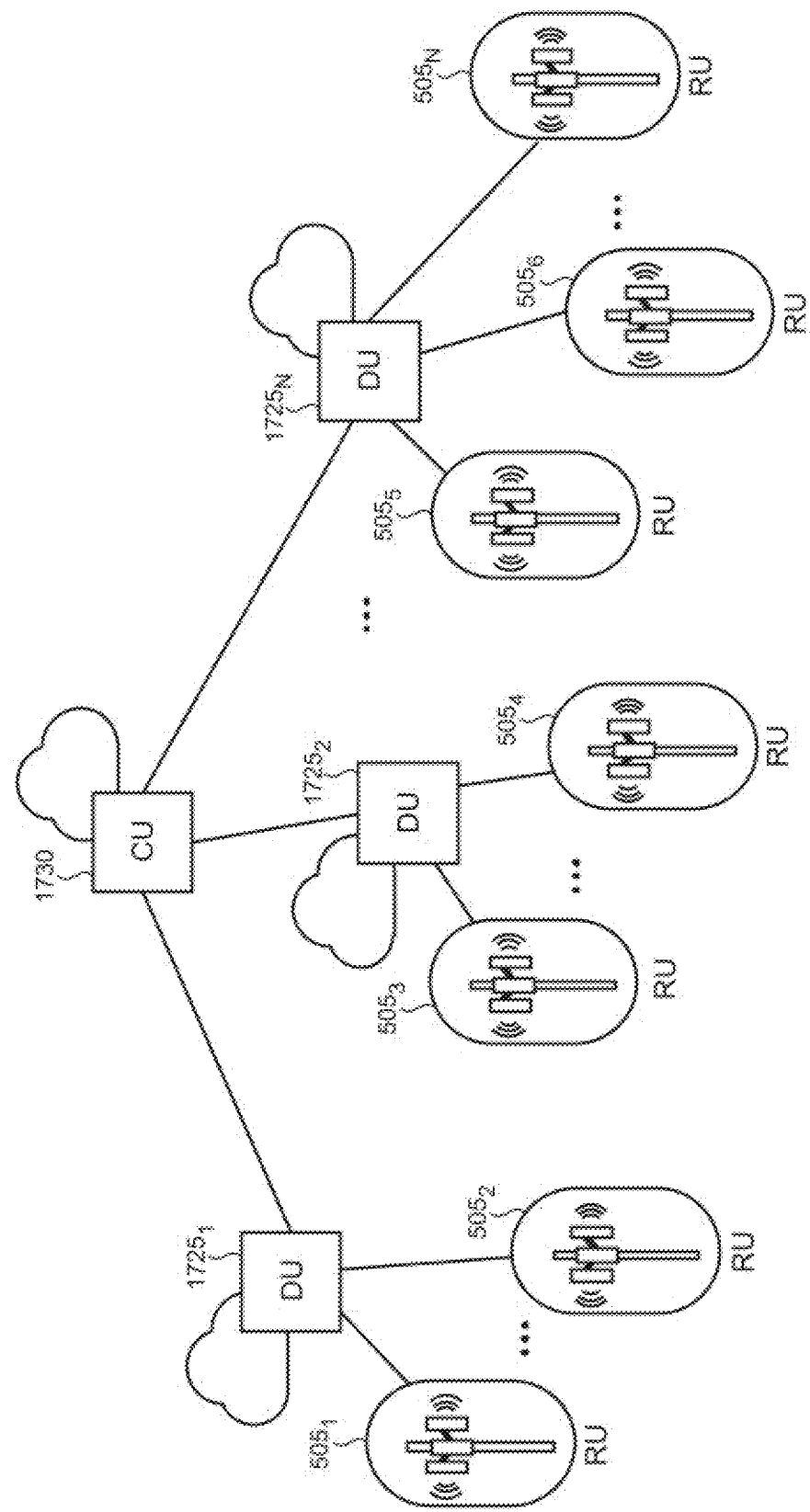
FIG. 18 shows an illustrative split-RAN hierarchy in which a central unit (CU) may support multiple distributed units (DUs) which, in turn, may support multiple RUs.

The split-RAN configuration shown in FIG. 18 enables RAN functionality to be split among physical infrastructure elements in centralized and distributed locations. For example, as shown in FIG. 18, a single CU 1730 may be configured to serve multiple DUs 1725, each of which in turn serves multiple RUs 505.

Figure 19:
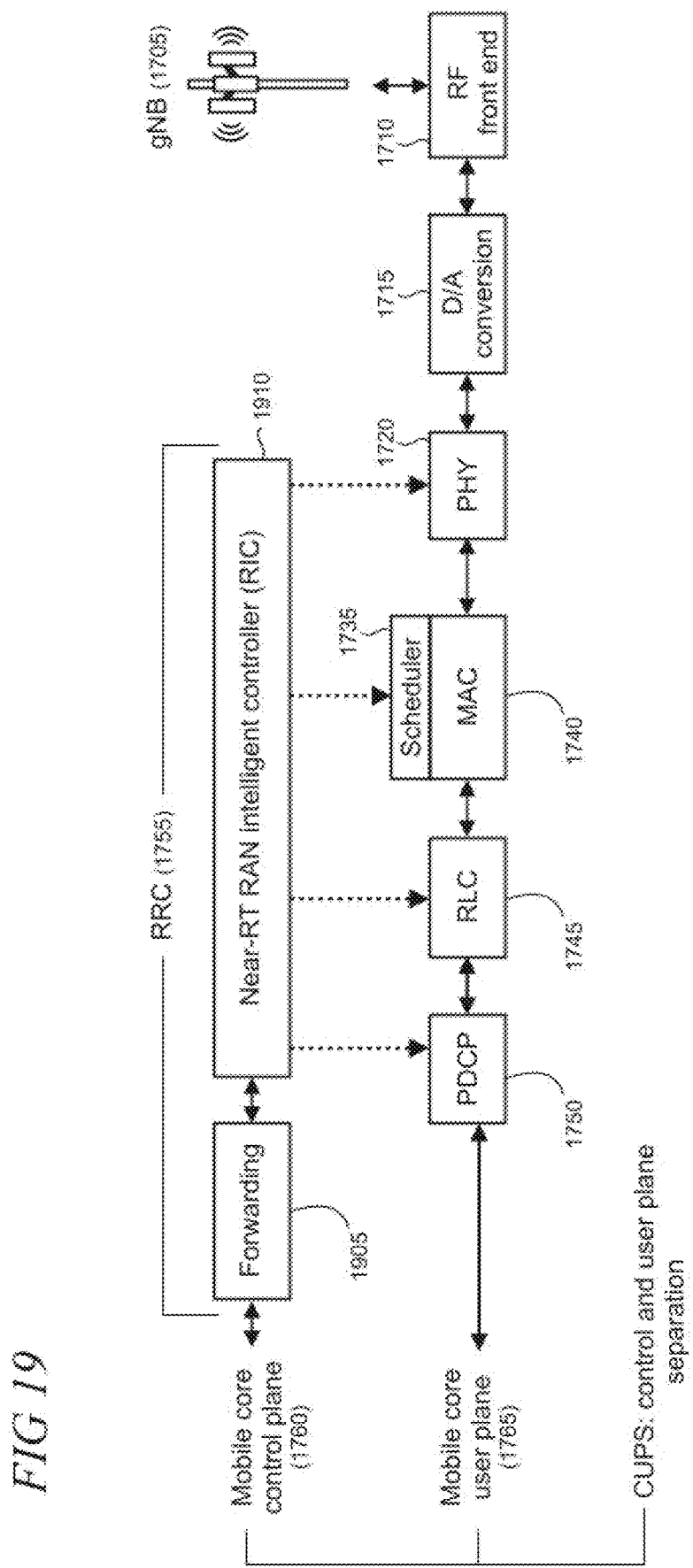
FIG. 19 shows an illustrative radio resource control (RRC) that is disaggregated into a mobile core-facing control plane component and a near-real-time RAN intelligent controller (near-RT RIC)

FIG. 19 shows that the RRC layer component 1755 may be disaggregated into a mobile core-facing control plane forwarding component 1905 and a near-real-time (RT) RAN intelligent controller (MC) 1910. The RRC layer component is thus responsible for only near-real-time configuration and control decision making, while the scheduler 1735 on the MAC component 1740 is responsible for real-time scheduling decisions.

The scheduling may be performed to create RAN slices by allocating logical representations of physical radio resources in the PHY component 1720 associated with an air interface between UE 200 (FIG. 6) and RU 505. The MAC component 1740 may perform RAN slice resource allocation through interactions, for example, with the RAN slice controller 405 (FIG. 4). More specifically, a physical radio resource is partitioned into multiple blocks or segments each defined by one numerology to meet certain communication requirements, such as low latency, wide coverage, etc. Numerology refers to the values of the basic physical transmission parameters, particularly including, for example, the transmission time slot length in which length of the slot is shorter for higher numerologies.

Each RAN portion of a network slice occupies a subset of physical resources taken from one or multiple numerology segments which may be represented using dimensions comprising frequency (e.g., subcarriers) and time (e.g., time slots). In 5G, slots support frame structures of the radio resources in the time domain which are 10 ms in length irrespective of the numerology in use but may vary in width in the frequency domain. For example, a RAN slice serving automotive services in a high mobility scenario may use a wider subcarrier spacing to combat high Doppler shifts, while a RAN slice serving a latency-sensitive service such as real-time gaming may use fewer symbols in each subframe. It may be appreciated that spatial multiplexing, referred to as MIMO (multiple input, multiple output), may also be utilized to provide additional layers of RAN resources that the slice controller may allocate in some implementations.

Figure 20:
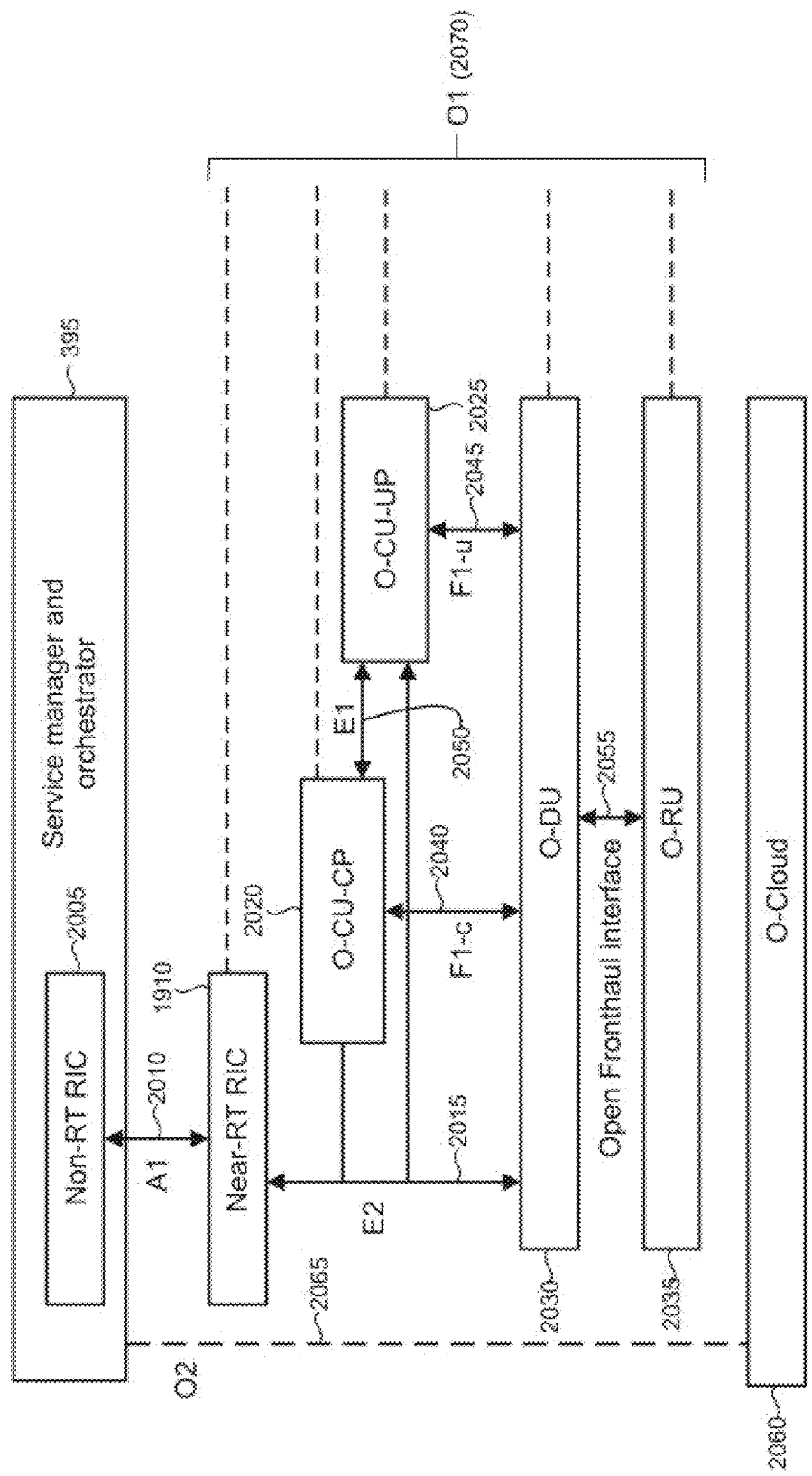
FIG. 20 shows an illustrative RAN operations and maintenance (OAM) logical architecture as described by the O-RAN (Open Radio Access Network) Alliance.

FIG. 20 shows an illustrative RAN operations and maintenance (OAM) logical architecture 2000, as described by the O-RAN Alliance. In the drawing, the "O" prefix indicates the O-RAN implementation for the functional elements of the architecture. The O-RAN Alliance defines and maintains the A1, E2, O1, O2, and Open Fronthaul interfaces discussed below. As shown, a non-RT RIC 2005 may be incorporated into the service manager and orchestrator 395. The non-RT MC interoperates with a near-RT MC 1910 through an A1 interface 2010.

The near-RT RIC 1910 is coupled over an E2 interface 2015 with network functions for radio access for control and optimization including the O-CU-CP (O-RAN Central Unit-Control Plane) 2020, O-CU-UP (O-RAN Central Unit-User Plane) 2025, and O-DU 2030. The O-CU-CP and O-CU-UP are respectively coupled to the O-DU over F1-c and F1-u interfaces, 2040 and 2045, as defined and maintained by 3GPP. The O-CU-CP is coupled to the O-CU-UP over a 3GPP E1 interface 2050. The O-DU and O-RU 2035 are coupled using an Open Fronthaul interface 2055 (also known as the lower layer split (LLS) interface).

The O-Cloud 2060 is a cloud computing platform comprising a collection of physical infrastructure nodes that meet O-RAN requirements to host the relevant O-RAN functions (i.e., near-RT RIC, O-CU-CP, O-CU-UP, and O-DU), the supporting software components (such as Operating System, Virtual Machine Monitor, Container Runtime, etc.), and the appropriate management and orchestration functions to create virtual network instances and map network functions. The O-Cloud is coupled to the service manager and orchestrator 395 over the O2 interface 2065. An O1 interface 2070 is provided to each of the near-RT MC, O-CU-CP, O-CU-UP, O-DU, and O-RU, as shown in FIG. 20.

Figure 21:
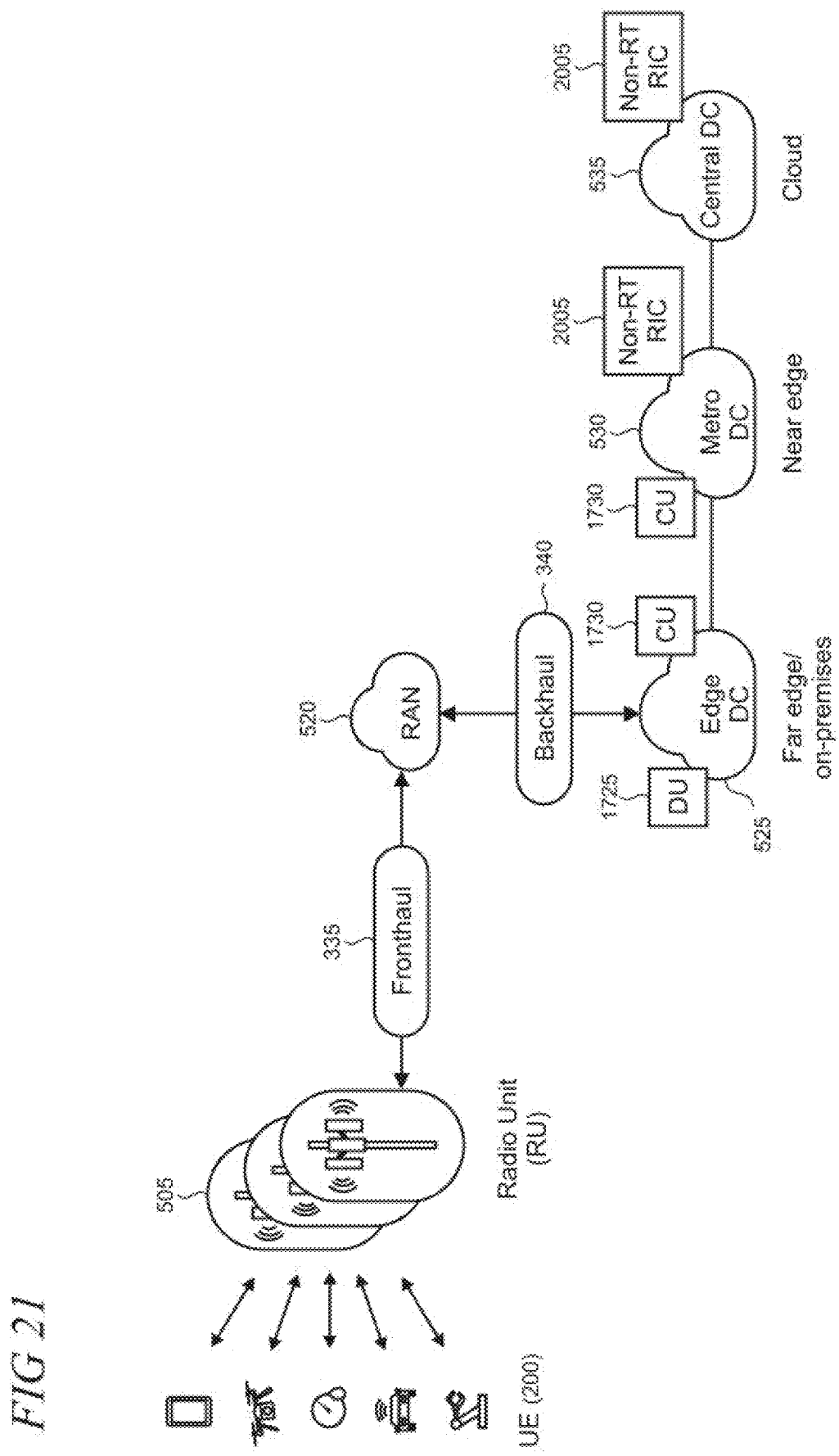
FIG. 21 shows an illustrative 5G implementation in which split-RAN functional units and instances of the non-real-time RIC (non-RT RIC) may be distributed among physical infrastructure components.

The splitting of functional elements among the DU, CU, near-RT MC, and non-RT MC, as discussed above, enables flexible deployment of instances of such elements in the physical infrastructure that underlies a typical 5G network. FIG. 21 shows an illustrative implementation in which split-RAN functional units and instances of the non-RT RIC may be distributed among physical infrastructure components of a 5G network 500. For example, as shown, a DU 1725 and CU 1730 may be located at the edge DC 525. A CU 1730 and non-RT RIC 2005 may be located in the metro DC 530. The central DC 535 can also host a non-RT RIC in some cases. In some implementations, the RAN slice controller 405 (FIG. 4) may be instantiated, for example, as a component of the near-RT MC 1910 to thereby implement or combine the functionality of the scheduler 1735 (FIG. 17).

Figure 22:
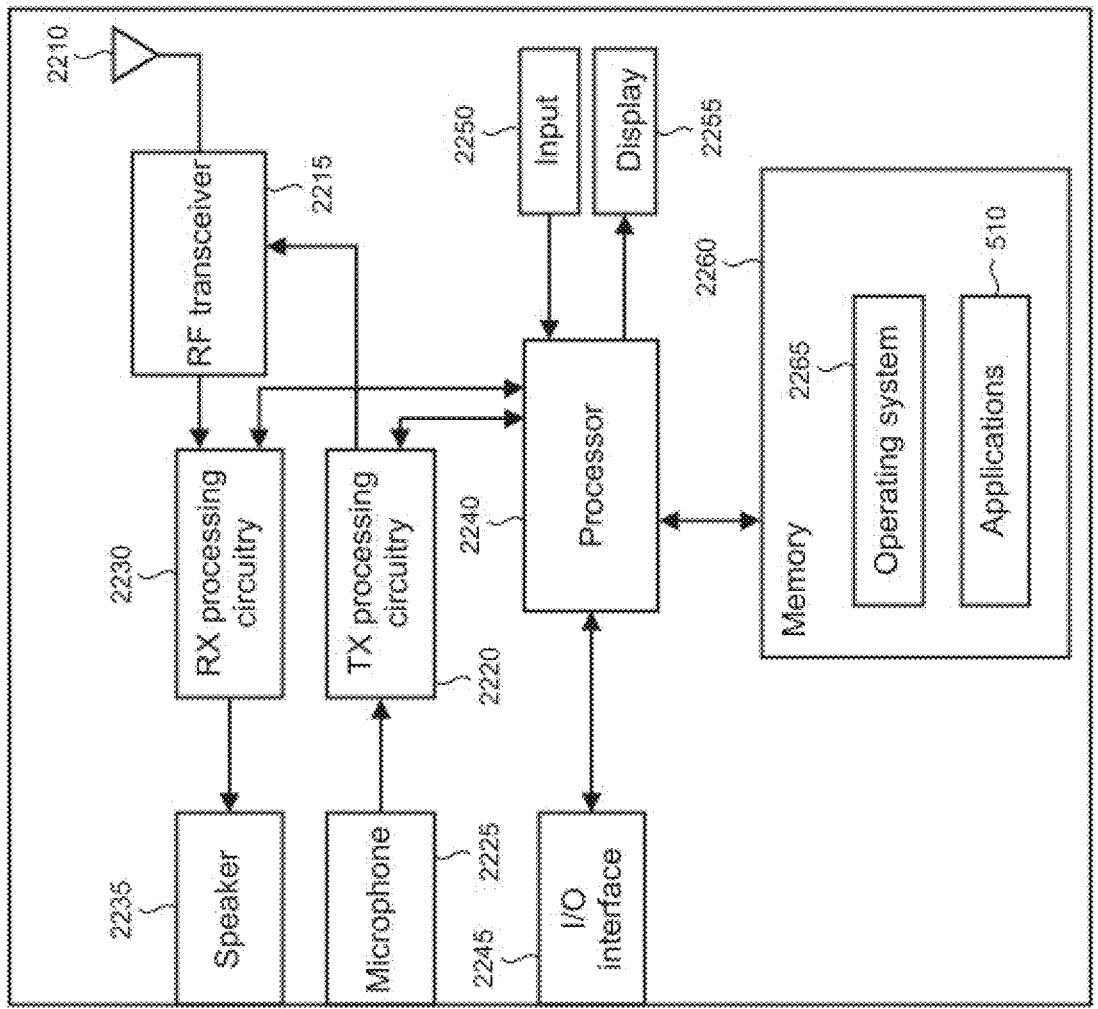
FIG. 22 is a block diagram of an illustrative UE that may be used at least in part to implement the present dedicated WAN slices.

FIG. 22 is a block diagram of an illustrative UE 200 that may be used at least in part to implement the present dedicated WAN slices. The embodiment of the UE 200 shown in FIG. 22 is for illustration only, and the UEs 200 shown in the drawings and described in the preceding text may have the same or similar configuration. However, it is noted that UEs may come in a wide variety of configurations, and FIG. 22 does not limit the scope of the present disclosure to any particular implementation of a UE.

The UE 200 includes an antenna 2210, a radio frequency (RF) transceiver 2215, transmit (TX) processing circuitry 2220, a microphone 2225, and receive (RX) processing circuitry 2230. The UE 200 also includes a speaker 2235, a processor 2240, an input/output (I/O) interface 2245, an input device 2250, a display 2255, and a memory 2260. The memory includes an operating system (OS) program 2265 and one or more applications 510.

The RF transceiver 2215 receives from the antenna 2210, an incoming RF signal transmitted by a gNB of a 5G network 500 (FIG. 5). The RF transceiver down-converts the incoming RF signal to generate an intermediate frequency (IF) or baseband signal. The IF or baseband signal is sent to the RX processing circuitry 2230, which generates a processed baseband signal by filtering, decoding, and/or digitizing the baseband or IF signal. The RX processing circuitry transmits the processed baseband signal to the speaker 2235 (such as for voice data) or to the processor 2240 for further processing (such as for web browsing data).

The TX processing circuitry 2220 receives analog or digital voice data from the microphone 2225 or other outgoing baseband data (such as web data, e-mail, or interactive video game data) from the processor 2240. The TX processing circuitry 2220 encodes, multiplexes, and/or digitizes the outgoing baseband data to generate a processed baseband or IF signal. The RF transceiver 2215 receives the outgoing processed baseband or IF signal from the TX processing circuitry and up-converts the baseband or IF signal to an RF signal that is transmitted via the antenna.

The processor 2240 can include one or more processors or other processing devices and execute the OS program 2265 stored in the memory 2260 to control the overall operation of the UE 200. For example, the processor may control the reception of forward channel signals and the transmission of reverse channel signals by the RF transceiver 2215, the RX processing circuitry 2230, and the TX processing circuitry 2220 in accordance with well-known principles. In some embodiments, the processor 2240 includes at least one microprocessor or microcontroller.

The processor 2240 may be configured for executing other processes and programs resident in the memory 2260, such as operations for CSI measurement and reporting for systems described in embodiments of the present disclosure. The processor can move data into or out of the memory as required by an executing process. In some embodiments, the processor may be configured to execute the applications 510 based on the OS program 2265 or in response to signals received from gNBs or an operator. The processor is also coupled to the I/O interface 2245, which provides the UE 200 with the ability to connect to other computing devices such as laptop computers and handheld computers. The I/O interface may thus function as a communication path between such accessories and the processor.

The processor 2240 is also coupled to the input device 2250 (e.g., keypad, touchscreen, buttons etc.) and the display 2255. A user of the UE 200 can typically employ the input device to enter data into the UE. For example, the display can be a liquid crystal display or other display capable of rendering text and/or graphics, video, etc., from web sites, applications, and/or service providers.

The memory 2260 is coupled to the processor 2240. Part of the memory may include a random access memory (RAM), and another part of the memory may include a Flash memory or other read-only memory (ROM).

As described in more detail below, the UE 200 can perform signaling and calculation for channel state information (CSI) reporting. Although FIG. 22 shows one illustrative example of UE 200, it may be appreciated that various changes may be made to the drawing. For example, various components may be combined, further subdivided, or omitted, and additional components may be added according to specific needs. As a particular example, the processor 2240 may be divided into multiple processors, such as one or more central processing units (CPUs) and one or more graphics processing units (GPUs). Also, while FIG. 22 depicts the UE 200 as configured as a mobile device, such as a smartphone, UEs may be configured to operate as other types of portable or stationary devices.

Figure 23:
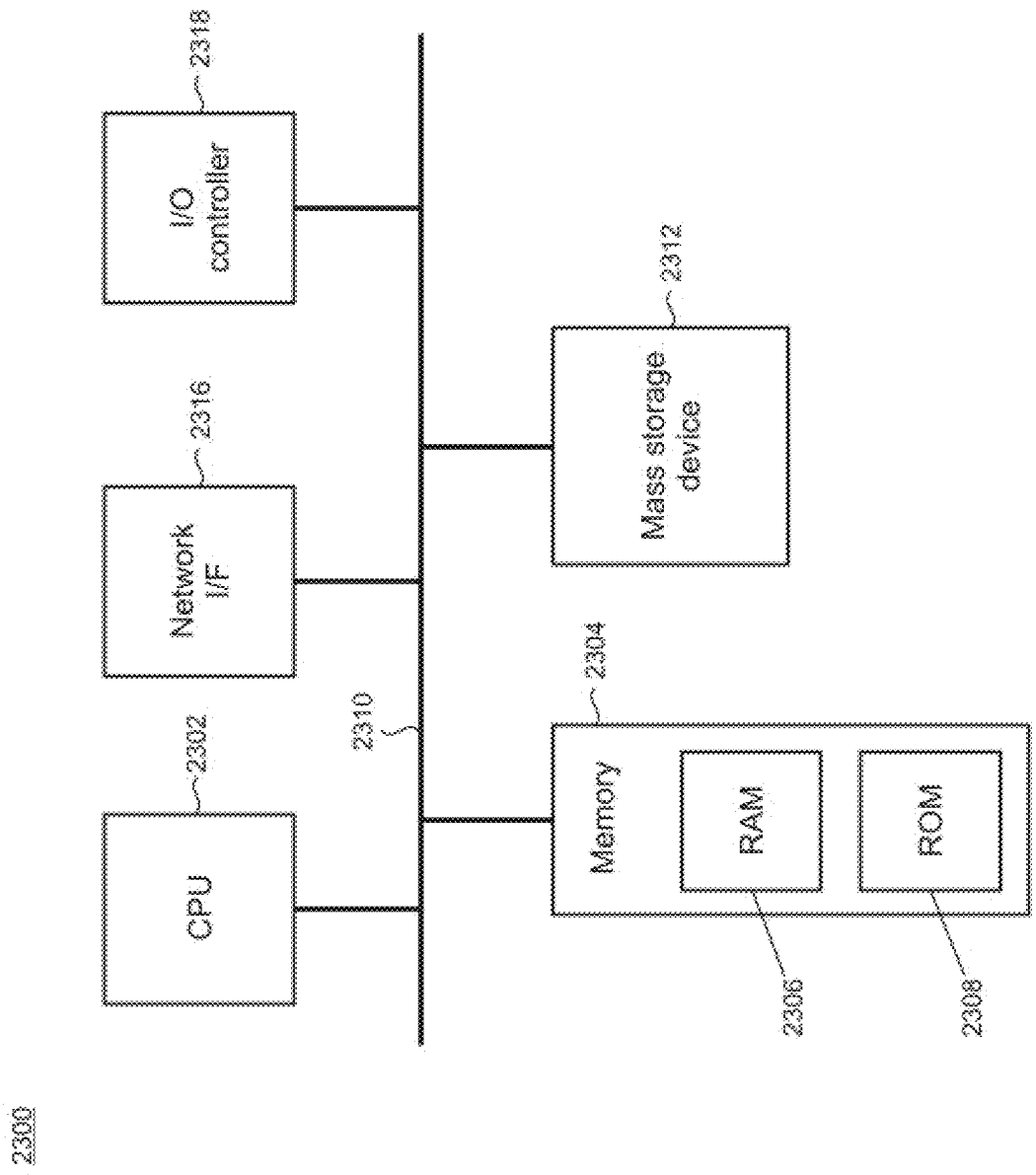
FIG. 23 is a block diagram of an illustrative server or computing device that may be used at least in part to implement the present dedicated WAN slices.

FIG. 23 shows an illustrative architecture 2300 for a computing device, such as a server, capable of executing the various components described herein for dedicated WAN slices. The architecture 2300 illustrated in FIG. 23 includes one or more processors 2302 (e.g., central processing unit, dedicated AI chip, graphics processing unit, etc.), a system memory 2304, including RAM (random access memory) 2306 and ROM (read only memory) 2308, and a system bus 2310 that operatively and functionally couples the components in the architecture 2300. A basic input/output system containing the basic routines that help to transfer information between elements within the architecture 2300, such as during startup, is typically stored in the ROM 2308. The architecture 2300 further includes a mass storage device 2312 for storing software code or other computer-executed code that is utilized to implement applications, the file system, and the operating system. The mass storage device 2312 is connected to the processor 2302 through a mass storage controller (not shown) connected to the bus 2310. The mass storage device 2312 and its associated computer-readable storage media provide non-volatile storage for the architecture 2300. Although the description of computer-readable storage media contained herein refers to a mass storage device, such as a hard disk or CD-ROM drive, it may be appreciated by those skilled in the art that computer-readable storage media can be any available storage media that can be accessed by the architecture 2300.

By way of example, and not limitation, computer-readable storage media may include volatile and non-volatile, removable and non-removable media implemented in any method or technology for storage of information such as computer-readable instructions, data structures, program modules, or other data. For example, computer-readable media includes, but is not limited to, RAM, ROM, EPROM (erasable programmable read only memory), EEPROM (electrically erasable programmable read only memory), Flash memory or other solid state memory technology, CD-ROM, DVDs, HD-DVD (High Definition DVD), Blu-ray, or other optical storage, magnetic cassettes, magnetic tape, magnetic disk storage or other magnetic storage devices, or any other medium which can be used to store the desired information and which can be accessed by the architecture 2300.

According to various embodiments, the architecture 2300 may operate in a networked environment using logical connections to remote computers through a network. The architecture 2300 may connect to the network through a network interface unit 2316 connected to the bus 2310. It may be appreciated that the network interface unit 2316 also may be utilized to connect to other types of networks and remote computer systems. The architecture 2300 also may include an input/output controller 2318 for receiving and processing input from a number of other devices, including a keyboard, mouse, touchpad, touchscreen, control devices such as buttons and switches or electronic stylus (not shown in FIG. 23). Similarly, the input/output controller 2318 may provide output to a display screen, user interface, a printer, or other type of output device (also not shown in FIG. 23).

It may be appreciated that the software components described herein may, when loaded into the processor 2302 and executed, transform the processor 2302 and the overall architecture 2300 from a general-purpose computing system into a special-purpose computing system customized to facilitate the functionality presented herein. The processor 2302 may be constructed from any number of transistors or other discrete circuit elements, which may individually or collectively assume any number of states. More specifically, the processor 2302 may operate as a finite-state machine, in response to executable instructions contained within the software modules disclosed herein. These computer-executable instructions may transform the processor 2302 by specifying how the processor 2302 transitions between states, thereby transforming the transistors or other discrete hardware elements constituting the processor 2302.

Encoding the software modules presented herein also may transform the physical structure of the computer-readable storage media presented herein. The specific transformation of physical structure may depend on various factors, in different implementations of this description. Examples of such factors may include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media to change the optical characteristics of those locations. Other transformations of physical media are possible without departing from the scope and spirit of the present description, with the foregoing examples provided only to facilitate this discussion.

In light of the above, it may be appreciated that many types of physical transformations take place in the architecture 2300 in order to store and execute the software components presented herein. It also may be appreciated that the architecture 2300 may include other types of computing devices, including wearable devices, handheld computers, embedded computer systems, smartphones, PDAs, and other types of computing devices known to those skilled in the art. It is also contemplated that the architecture 2300 may not include all of the components shown in FIG. 23, may include other components that are not explicitly shown in FIG. 23, or may utilize an architecture completely different from that shown in FIG. 23.

Figure 24:
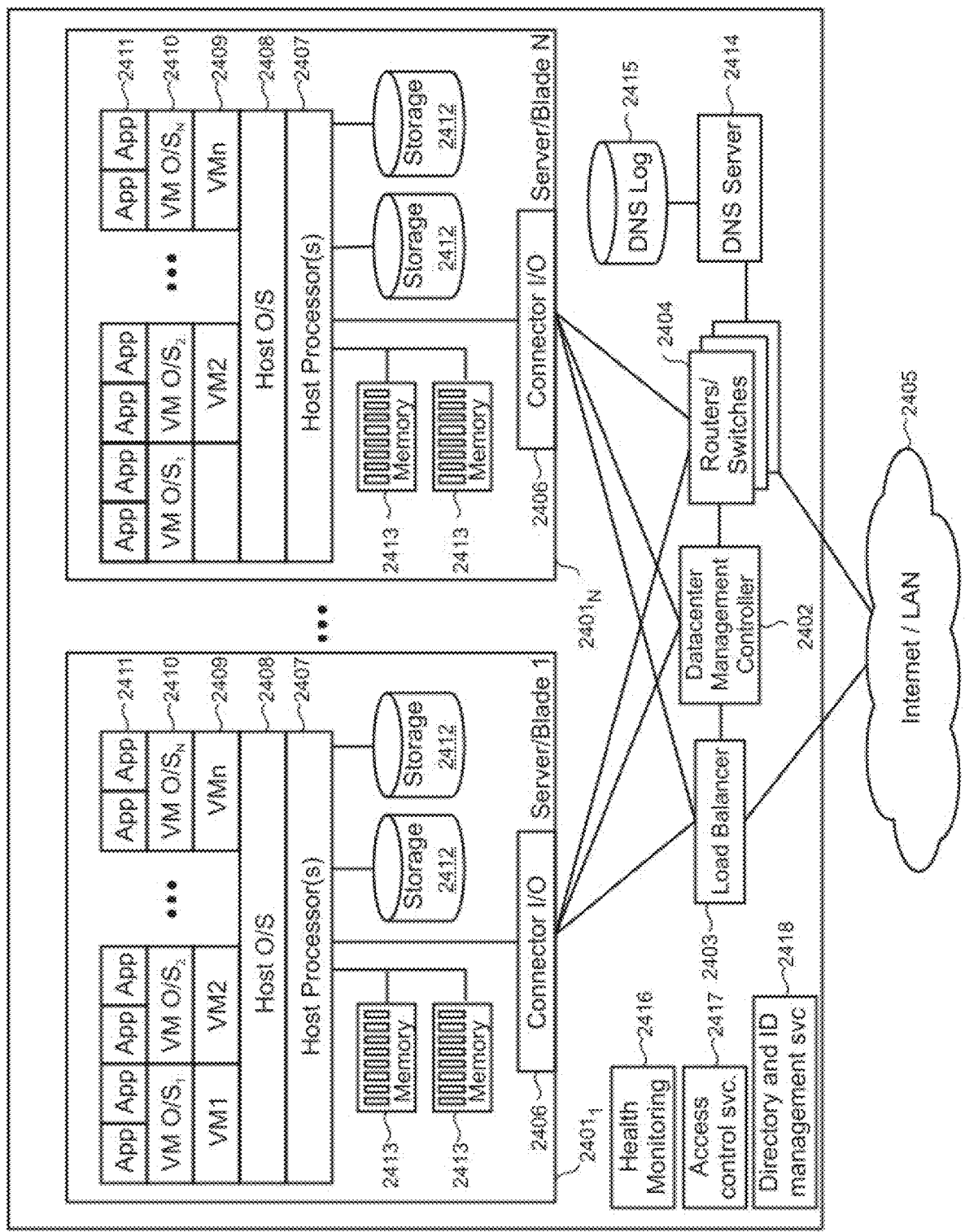
FIG. 24 is a block diagram of an illustrative datacenter that may be used at least in part to implement the present dedicated WAN slices.

FIG. 24 is a high-level block diagram of an illustrative datacenter 2400 that provides cloud computing services or distributed computing services that may be used to implement the present dedicated WAN slices. Datacenter 2400 may incorporate one or more of the features disclosed in the DCs shown in the drawings and described in the accompanying text. A plurality of servers 2401 are managed by datacenter management controller 2402. Load balancer 2403 distributes requests and computing workloads over servers 2401 to avoid a situation wherein a single server may become overwhelmed. Load balancer 2403 maximizes available capacity and performance of the resources in datacenter 2400. Routers/switches 2404 support data traffic between servers 2401 and between datacenter 2400 and external resources and users (not shown) via an external network 2405, which may be, for example, a local area network (LAN) or the Internet.

Servers 2401 may be standalone computing devices, and/or they may be configured as individual blades in a rack of one or more server devices. Servers 2401 have an input/output (I/O) connector 2406 that manages communication with other database entities. One or more host processors 2407 on each server 2401 run a host operating system (O/S) 2408 that supports multiple virtual machines (VM) 2409. Each VM 2409 may run its own O/S so that each VM O/S 2410 on a server is different, or the same, or a mix of both. The VM O/Ss 2410 may be, for example, different versions of the same O/S (e.g., different VMs running different current and legacy versions of the Windows® operating system). In addition, or alternatively, the VM O/Ss 2410 may be provided by different manufacturers (e.g., some VMs running the Windows® operating system, while other VMs are running the Linux® operating system). Each VM 2409 may also run one or more applications (App) 2411. Each server 2401 also includes storage 2412 (e.g., hard disk drives (HDD)) and memory 2413 (e.g., RAM) that can be accessed and used by the host processors 2407 and VMs 2409 for storing software code, data, etc. In one embodiment, a VM 2409 may employ the data plane APIs as disclosed herein.

Datacenter 2400 provides pooled resources on which customers or tenants can dynamically provision and scale applications as needed without having to add servers or additional networking. This allows tenants to obtain the computing resources they need without having to procure, provision, and manage infrastructure on a per-application, ad-hoc basis. A cloud computing datacenter 2400 allows tenants to scale up or scale down resources dynamically to meet the current needs of their business. Additionally, a datacenter operator can provide usage-based services to tenants so that they pay for only the resources they use, when they need to use them. For example, a tenant may initially use one VM 2409 on server 2401$_1$ to run their applications 2411. When demand for an application 2411 increases, the datacenter 2400 may activate additional VMs 2409 on the same server 2401$_1$ and/or on a new server 2401$_N$ as needed. These additional VMs 2409 can be deactivated if demand for the application later drops.

Datacenter 2400 may offer guaranteed availability, disaster recovery, and back-up services. For example, the datacenter may designate one VM 2409 on server 2401₁ as the primary location for the tenant's application and may activate a second VM 2409 on the same or a different server as a standby or back-up in case the first VM or server 2401₁ fails. The datacenter management controller 2402 automatically shifts incoming user requests from the primary VM to the back-up VM without requiring tenant intervention. Although datacenter 2400 is illustrated as a single location, it will be understood that servers 2401 may be distributed to multiple locations across the globe to provide additional redundancy and disaster recovery capabilities. Additionally, datacenter 2400 may be an on-premises, private system that provides services to a single enterprise user or may be a publicly accessible, distributed system that provides services to multiple, unrelated customers and tenants or may be a combination of both.

Domain Name System (DNS) server 2414 resolves domain and host names into IP addresses for all roles, applications, and services in datacenter 2400. DNS log 2415 maintains a record of which domain names have been resolved by role. It will be understood that DNS is used herein as an example and that other name resolution services and domain name logging services may be used to identify dependencies, for example, in other embodiments, IP or packet sniffing, code instrumentation, or code tracing.

Datacenter health monitoring 2416 monitors the health of the physical systems, software, and environment in datacenter 2400. Health monitoring 2416 provides feedback to datacenter managers when problems are detected with servers, blades, processors, or applications in datacenter 2400 or when network bandwidth or communications issues arise.

Access control service 2417 determines whether users are allowed to access particular connections and services provided at the datacenter 2400. Directory and identity management service 2418 authenticates user credentials for tenants on datacenter 2400.

Figure 25:
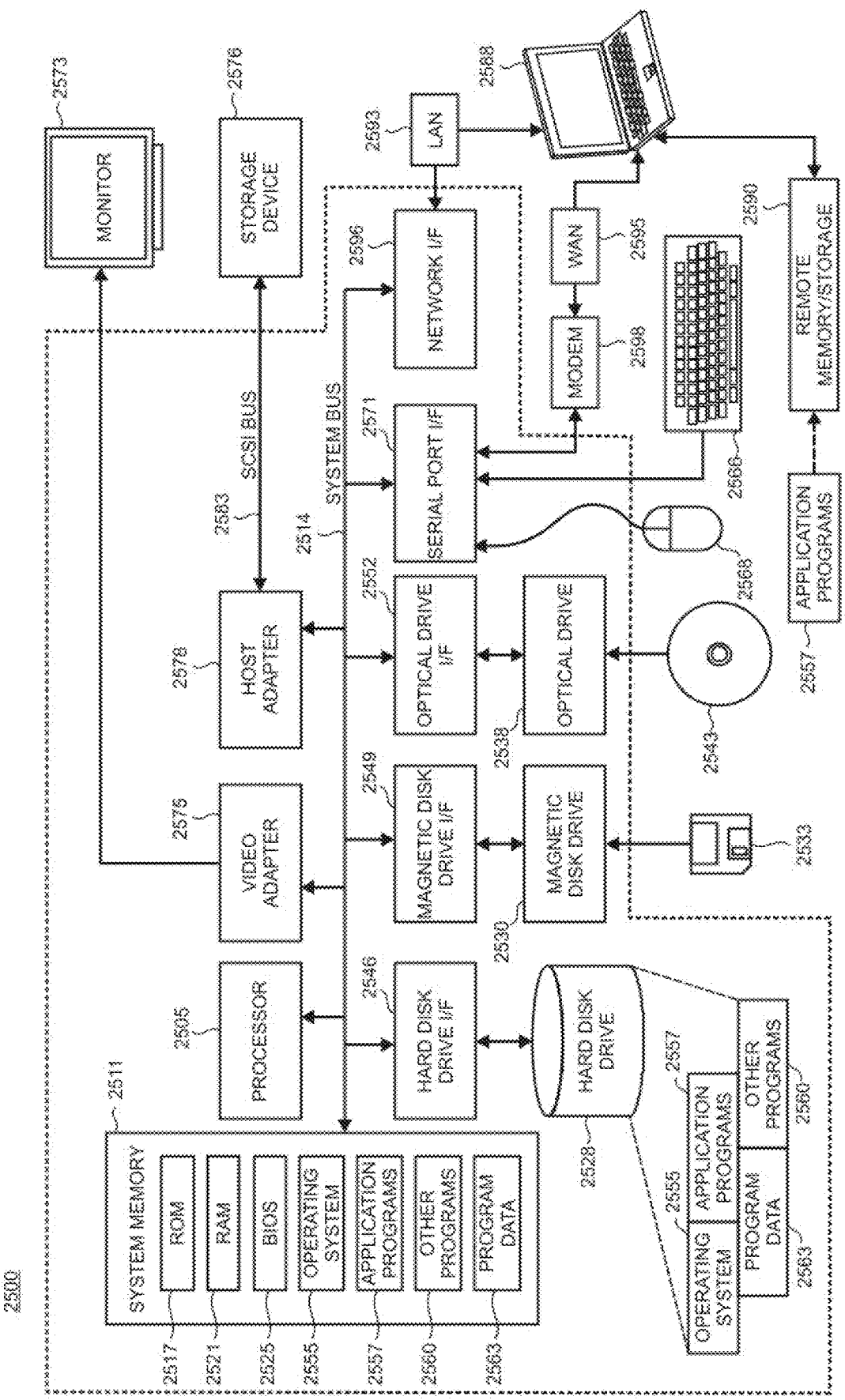
FIG. 25 is a simplified block diagram of an illustrative computer system that may be used at least in part to implement the present dedicated WAN slices.

FIG. 25 is a simplified block diagram of an illustrative computer system 2500 such as a PC, client machine, or server with which the present dedicated WAN slices may be implemented. Computer system 2500 includes a processor 2505, a system memory 2511, and a system bus 2514 that couples various system components including the system memory 2511 to the processor 2505. The system bus 2514 may be any of several types of bus structures including a memory bus or memory controller, a peripheral bus, or a local bus using any of a variety of bus architectures. The system memory 2511 includes read only memory (ROM) 2517 and random access memory (RAM) 2521. A basic input/output system (BIOS) 2525, containing the basic routines that help to transfer information between elements within the computer system 2500, such as during startup, is stored in ROM 2517. The computer system 2500 may further include a hard disk drive 2528 for reading from and writing to an internally disposed hard disk (not shown), a magnetic disk drive 2530 for reading from or writing to a removable magnetic disk 2533 (e.g., a floppy disk), and an optical disk drive 2538 for reading from or writing to a removable optical disk 2543 such as a CD (compact disc), DVD (digital versatile disc), or other optical media. The hard disk drive 2528, magnetic disk drive 2530, and optical disk drive 2538 are connected to the system bus 2514 by a hard disk drive interface 2546, a magnetic disk drive interface 2549, and an optical drive interface 2552, respectively. The drives and their associated computer-readable storage media provide non-volatile storage of computer-readable instructions, data structures, program modules, and other data for the computer system 2500. Although this illustrative example includes a hard disk, a removable magnetic disk 2533, and a removable optical disk 2543, other types of computer-readable storage media which can store data that is accessible by a computer such as magnetic cassettes, Flash memory cards, digital video disks, data cartridges, random access memories (RAMs), read only memories (ROMs), and the like may also be used in some applications of the present dedicated WAN slices. In addition, as used herein, the term computer-readable storage media includes one or more instances of a media type (e.g., one or more magnetic disks, one or more CDs, etc.). For purposes of this specification and the claims, the phrase "computer-readable storage media" and variations thereof, are intended to cover non-transitory embodiments, and does not include waves, signals, and/or other transitory and/or intangible communication media.

A number of program modules may be stored on the hard disk, magnetic disk 2533, optical disk 2543, ROM 2517, or RAM 2521, including an operating system 2555, one or more application programs 2557, other program modules 2560, and program data 2563. A user may enter commands and information into the computer system 2500 through input devices such as a keyboard 2566 and pointing device 2568 such as a mouse. Other input devices (not shown) may include a microphone, joystick, game pad, satellite dish, scanner, trackball, touchpad, touchscreen, touch-sensitive device, voice-command module or device, user motion or user gesture capture device, or the like. These and other input devices are often connected to the processor 2505 through a serial port interface 2571 that is coupled to the system bus 2514, but may be connected by other interfaces, such as a parallel port, game port, or universal serial bus (USB). A monitor 2573 or other type of display device is also connected to the system bus 2514 via an interface, such as a video adapter 2575. In addition to the monitor 2573, personal computers typically include other peripheral output devices (not shown), such as speakers and printers. The illustrative example shown in FIG. 25 also includes a host adapter 2578, a Small Computer System Interface (SCSI) bus 2583, and an external storage device 2576 connected to the SCSI bus 2583.

The computer system 2500 is operable in a networked environment using logical connections to one or more remote computers, such as a remote computer 2588. The remote computer 2588 may be selected as another personal computer, a server, a router, a network PC, a peer device, or other common network node, and typically includes many or all of the elements described above relative to the computer system 2500, although only a single representative remote memory/storage device 2590 is shown in FIG. 25. The logical connections depicted in FIG. 25 include a local area network (LAN) 2593 and a wide area network (WAN) 2595. Such networking environments are often deployed, for example, in offices, enterprise-wide computer networks, intranets, and the Internet.

When used in a LAN networking environment, the computer system 2500 is connected to the local area network 2593 through a network interface or adapter 2596. When used in a WAN networking environment, the computer system 2500 typically includes a broadband modem 2598, network gateway, or other means for establishing communications over the wide area network 2595, such as the Internet. The broadband modem 2598, which may be internal or external, is connected to the system bus 2514 via a serial port interface 2571. In a networked environment, program modules related to the computer system 2500, or portions thereof, may be stored in the remote memory storage device 2590. It is noted that the network connections shown in FIG. 25 are illustrative and other means of establishing a communications link between the computers may be used depending on the specific requirements of an application of the present dedicated WAN slices.

Various exemplary embodiments of the present dedicated wide area network slices are now presented by way of illustration and not as an exhaustive list of all embodiments. An example includes a computer-implemented method for slicing a wide area network (WAN) that operates as at least a portion of a transport network of a 5G (fifth generation) network, the method comprising: implementing a WAN slice controller that is operatively coupled to physical infrastructure underlying the transport network of the 5G network, the infrastructure comprising one or more wavelength division multiplexed (WDM) optical transport systems that traverse nodes of the WAN; selecting nodes on a WAN slice path including an entry node, a destination node, and zero or more intermediate nodes between the entry node and the destination node; carving out optical spectrum on the WAN for contiguous utilization across each of the nodes on the WAN slice path; and provisioning the nodes of the WAN slice path to utilize the carved out optical spectrum for network traffic on the 5G network to instantiate a WAN slice extending from the entry node to the destination node.

In another example, the WAN slice controller is instantiated as an SDN (software defined networking) element. In another example, the one or more optical transport systems comprise fiber optic lines and optical amplifiers. In another example, the computer-implemented method further comprises dedicating the WAN slice to network traffic associated with a single customer. In another example, the computer-implemented method further comprises monitoring states of the WAN nodes and utilizing the monitored states in the provisioning. In another example, the computer-implemented method further comprises performing the provisioning in view of quality of service (QoS) guarantees that are applicable to the WAN slice. In another example, the carved out optical spectrum comprises one or more wavelengths that are utilized in the WDM optical transport systems. In another example, the computer-implemented method further comprises configuring the WAN slice to carry network traffic in which optical bypass of the zero or more intermediate nodes is maximized and OEO (optical-electrical-optical) conversions at the zero or more intermediate nodes are minimized. In another example, the computer-implemented method further includes routing the network traffic from the destination node of the WAN along the slice path to an application server. In another example, at least one of the nodes on the WAN slice path is disposed in a data center.

A further example includes one or more non-transitory computer-readable memory devices storing computer-executable instructions which, upon execution by one or more processors disposed in a computing device, cause the computing device to: create a WAN (wide area network) slice comprising a selected subset of nodes of a WAN along a slice path that is utilized as a portion of a transport network of a 5G (fifth generation) network to provide point-to-point transport of 5G network traffic from an entry node to a destination node in an optical domain described by a selected wavelength that is contiguously utilized across the subset of nodes, the WAN slice including at least one intermediate node between the entry node and the destination node; interface with network elements in each of the nodes in the WAN slice to control routing of 5G network traffic on the slice path on the selected wavelength; and optically bypass the at least one intermediate node in the WAN slice in which the 5G network traffic routed through the at least one intermediate node remains in the optical domain without undergoing an OEO (optical-electrical-optical) conversion.

In another example, the network elements comprise one or more of switch, optical line terminal, multiplexer/demultiplexer, and wavelength selective switch. In another example, the wavelength is selected from a plurality of wavelengths in a wavelength division multiplexing (WDM) arrangement. In another example, the nodes in the WAN slice and the wavelength are utilized as decision variables in a network optimization model, the network optimization model being utilized to configure the WAN slice.

A further example includes a computing device comprising: at least one processor; and at least one hardware-based non-transitory computer-readable storage device having computer-executable instructions stored thereon which, when executed by the least one processor, cause the computing device to dynamically operate a wide area network (WAN) slice controller to control slicing of a WAN that provides transport network functionality for a 5G (fifth generation) network, in which the WAN slicing comprises provisioning nodes of the WAN to utilize a selected wavelength to carry 5G network traffic in a WAN slice from an entry node, through zero or more intermediate nodes, to a destination node; dynamically operate a radio access network (RAN) slice controller for a RAN in the 5G network, the RAN slice controller controlling slicing of the RAN by allocating physical resources to a RAN slice for an air interface of the RAN, in which the air interface provides access to user equipment (UE) to the RAN; and coordinate operations of the RAN slice controller and WAN slice controller to provide a contiguous 5G network slice comprising the RAN slice and WAN slice.

In another example, the physical resources comprise combinations of subcarrier and time slots. In another example, the computer-executable instructions further cause the computing device to perform core network slicing by deploying virtualized network functions in the contiguous 5G network slice. In another example, the coordinated operations are implemented using an end-to-end slice orchestration functionality. In another example, the WAN slice comprises at least one intermediate node which is optically bypassed by the 5G network traffic carried in the contiguous 5G network slice. In another example, the dynamic operations are performed in response to changing states of the 5G network.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A computer-implemented method for slicing a wide area network (WAN) that operates as at least a portion of a transport network of a 5G (fifth generation) network, the method comprising:

supporting utilization of a plurality of WAN slices, each WAN slice being implemented to transport data traffic over commonly-shared optical fiber systems of the transport network according to on-demand requests for network capacity, in which the plurality of WAN slices are mappable to one or more pre-defined service-based slice types described by International Telecommunication Union Radiocommunication Sector (ITU-R) recommendation M.2083-0;
implementing a WAN slice controller that is operatively coupled to physical infrastructure underlying the transport network of the 5G network, the infrastructure comprising one or more wavelength division multiplexed (WDM) optical transport systems that traverse nodes of the WAN;
selecting nodes on a WAN slice path including an entry node, a destination node, and zero or more intermediate nodes between the entry node and the destination node;
using the WAN slice controller for dynamically carving out optical spectrum on the WAN for contiguous utilization across each of the nodes on the WAN slice path according to the on-demand requests; and
provisioning the nodes of the WAN slice path to utilize the carved out optical spectrum for network traffic on the 5G network to instantiate a WAN slice extending from the entry node to the destination node, wherein the carved out spectrum is dedicated to the instantiated WAN slice.

2. The computer-implemented method of claim 1 in which the WAN slice controller is instantiated as an SDN (software defined networking) element.

3. The computer-implemented method of claim 1 in which the one or more optical transport systems comprise fiber optic lines and optical amplifiers.

4. The computer-implemented method of claim 1 further comprising dedicating the WAN slice to network traffic associated with a single customer.

5. The computer-implemented method of claim 1 further comprising monitoring states of the WAN nodes and utilizing the monitored states in the provisioning.

6. The computer-implemented method of claim 1 further comprising performing the provisioning in view of quality of service (QOS) guarantees that are applicable to the WAN slice.

7. The computer-implemented method of claim 1 in which the carved out optical spectrum comprises one or more wavelengths that are utilized in the WDM optical transport systems.

8. The computer-implemented method of claim 1 further comprising configuring the WAN slice to carry network traffic in which optical bypass of the zero or more intermediate nodes is maximized and OEO (optical-electrical-optical) conversions at the zero or more intermediate nodes are minimized.

9. The computer-implemented method of claim 1 further including routing the network traffic from the destination node of the WAN along the slice path to an application server.

10. The computer-implemented method of claim 1 in which at least one of the nodes on the WAN slice path is disposed in a data center.

11. A computing device, comprising:
at least one processor; and
at least one non-transitory computer-readable storage device having computer-executable instructions stored thereon which, when executed by the least one processor, cause the computing device to
support utilization of a plurality of slices of a wide area network (WAN), each WAN slice being implemented to transport data traffic over commonly-shared optical fiber systems of a transport network of a 5G (fifth generation) network according to on-demand requests for network capacity, in which the plurality of WAN slices are mappable to one or more pre-defined service-based slice types described by International Telecommunication Union Radiocommunication Sector (ITU-R) recommendation M.2083-0;
implement a WAN slice controller that is operatively coupled to physical infrastructure underlying the transport network of the 5G network, the infrastructure comprising one or more wavelength division multiplexed (WDM) optical transport systems that traverse nodes of the WAN;
select nodes on a WAN slice path including an entry node, a destination node, and zero or more intermediate nodes between the entry node and the destination node;
use the WAN slice controller for dynamically carving out optical spectrum on the WAN for contiguous utilization across each of the nodes on the WAN slice path according to the on-demand requests; and
provision the nodes of the WAN slice path to utilize the carved out optical spectrum for network traffic on the 5G network to instantiate a WAN slice extending from the entry node to the destination node, wherein the carved out spectrum is dedicated to the instantiated WAN slice.

12. The computing device of claim 11 in which the carved out optical spectrum comprises one or more wavelengths that are utilized in the WDM optical transport systems.

13. The computing device of claim 11 in which the executed instructions further cause the computing device to configure the WAN slice to carry network traffic in which optical bypass of the zero or more intermediate nodes is maximized and OEO (optical-electrical-optical) conversions at the zero or more intermediate nodes are minimized.

14. The computing device of claim 11 in which the executed instructions further cause the computing device to route the network traffic from the destination node of the WAN along the slice path to an application server.

15. The computing device of claim 11 in which at least one of the nodes on the WAN slice path is disposed in a data center.

16. One or more non-transitory computer-readable memory devices storing computer-executable instructions which, upon execution by one or more processors disposed in a computing device, cause the computing device to:
support utilization of a plurality of slices of a wide area network (WAN), each WAN slice being implemented to transport data traffic over commonly-shared optical fiber systems of a transport network of a 5G (fifth generation) network according to on-demand requests for network capacity, in which the plurality of WAN slices are mappable to one or more pre-defined service-based slice types described by International Telecommunication Union Radiocommunication Sector (ITU-R) recommendation M.2083-0;
implement a WAN slice controller that is operatively coupled to physical infrastructure underlying the transport network of the 5G network, the infrastructure comprising one or more wavelength division multiplexed (WDM) optical transport systems that traverse nodes of the WAN;
select nodes on a WAN slice path including an entry node, a destination node, and zero or more intermediate nodes between the entry node and the destination node;
use the WAN slice controller for dynamically carving out optical spectrum on the WAN for contiguous utilization across each of the nodes on the WAN slice path according to the on-demand requests; and provision the nodes of the WAN slice path to utilize the carved out optical spectrum for network traffic on the 5G network to instantiate a WAN slice extending from the entry node to the destination node, wherein the carved out spectrum is dedicated to the instantiated WAN slice.

17. The one or more non-transitory computer-readable memory devices of claim 16 in which the WAN slice controller is instantiated as an SDN (software defined networking) element.

18. The one or more non-transitory computer-readable memory devices of claim 16 in which the one or more optical transport systems comprise fiber optic lines and optical amplifiers.

19. The one or more non-transitory computer-readable memory devices of claim 16 in which the executed instructions further cause the computing device to dedicate the WAN slice to network traffic associated with a single customer.

20. The one or more non-transitory computer-readable memory devices of claim 16 in which the executed instructions further cause the computing device to monitor states of the WAN nodes and utilize the monitored states in the provisioning.

* * * * *